US006212386B1

(12) United States Patent
Briere et al.

(10) Patent No.: US 6,212,386 B1
(45) Date of Patent: Apr. 3, 2001

(54) AUTOMATED TOOL METHOD FOR FREQUENCY PLAN REVISION WITHIN A CELLULAR TELEPHONE SYSTEM

(75) Inventors: Sylvain Briere, Laval; Daniel Dufour; Vincent Guimont, both of Blainville, all of (CA); Patrik Karlsson, Alta; Daniel Bringby, Huddinge, both of (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/108,523

(22) Filed: Jun. 30, 1998

(51) Int. Cl.[7] ........................................................ H04Q 7/20
(52) U.S. Cl. ........................... 455/447; 455/62; 455/452
(58) Field of Search ................................. 455/423, 424, 455/425, 446, 434, 450, 452, 62, 552, 553, 67.1, 8, 9, 509, 447

(56) References Cited

U.S. PATENT DOCUMENTS

| | | | |
|---|---|---|---|
| 5,239,677 | * | 8/1993 | Jasinski .................................. 455/509 |
| 5,530,921 | * | 6/1996 | Dulong et al. ............................. 455/8 |
| 5,561,839 | | 10/1996 | Osterberg et al. . |
| 5,570,343 | * | 10/1996 | Bishop et al. ............................. 455/8 |
| 5,752,161 | * | 5/1998 | Jantti et al. ................................ 455/9 |
| 5,812,636 | * | 9/1998 | Tseng et al. ............................ 455/425 |
| 5,870,666 | * | 2/1999 | Tanaka et al. .......................... 455/67.1 |
| 5,963,865 | * | 10/1999 | Desgane et al. ........................ 455/509 |
| 5,966,657 | * | 10/1999 | Sporre .................................... 455/425 |
| 6,002,934 | * | 12/1999 | Boyer et al. ............................ 455/450 |
| 6,032,046 | * | 2/2000 | Nakano ................................. 455/67.1 |
| 6,035,207 | * | 3/2000 | Wang et al. ............................ 455/509 |

FOREIGN PATENT DOCUMENTS

| | | |
|---|---|---|
| 42 42 808 | 6/1994 | (DE) . |
| 43 03 999 A1 | 8/1994 | (DE) . |
| 0 847 213 A2 | 6/1998 | (EP) . |
| WO 94/06220 | 3/1994 | (WO) . |
| WO 95/34957 | 12/1995 | (WO) . |
| WO 96/06512 | 2/1996 | (WO) . |
| WO 96/17485 | 6/1996 | (WO) . |
| WO 96/31990 | 10/1996 | (WO) . |
| WO 96/31991 | 10/1996 | (WO) . |
| WO 97/01256 | 1/1997 | (WO) . |

OTHER PUBLICATIONS

PCT International Search Report; Nov. 3, 1999.

* cited by examiner

*Primary Examiner*—Nguyen Vo
(74) *Attorney, Agent, or Firm*—Jenkens & Gilchrist

(57) ABSTRACT

Interference and bit error rate measurements are made on the uplink and downlink to determine communications quality. Mobile station mobile assisted hand-off (MAHO) functionality is utilized to make the downlink measurements. Following filtering, the measurements are evaluated to identify potential candidates for reallocation. In one type of evaluation, when measured downlink bit error rate on a selected frequency is lower than a threshold and is worse than measured uplink bit error rate, then a better quality candidate is chosen to replace the selected frequency. In another type of evaluation, when a best available candidate has better interference than a worst quality one of the selected frequencies, that best candidate is chosen to replace the selected frequency.

39 Claims, 18 Drawing Sheets

AUTOMATED TOOL METHOD FOR FREQUENCY PLAN REVISION WITHIN A CELLULAR TELEPHONE SYSTEM

CROSS-REFERENCE TO RELATED APPLICATION

The present application is related to and incorporates by reference the following previously filed, commonly assigned, co-pending applications for patent:

"METHOD FOR FREQUENCY MODE VALIDATION FOR, FREQUENCY ASSIGNMENT FOR, AND EVALUATING THE NETWORK EFFECT OF A FREQUENCY PLAN REVISION WITHIN A DUAL MODE CELLULAR TELEPHONE SYSTEM", Ser. No. 08/852,879, filed May 8, 1997, by Vincent Guimont, et al. U.S. Pat. No. 6,052,593, and "OPERATOR ASSISTED TOOL AND METHOD FOR FREQUENCY PLAN REVISION WITHIN A CELLULAR TELEPHONE SYSTEM", Ser. No. 09/017,299, filed Feb. 2, 1998, by Vincent Guimont, et al. U.S. Pat. No. 6,049,717.

BACKGROUND OF THE INVENTION

1. Technical Field of the Invention

The present invention relates to cellular telephone systems and, in particular, to an automated and autonomous method and tool for assigning frequencies to transceivers in cells of a cellular telephone system supporting analog and/or digital communications channels.

2. Description of Related Art

Cellular telephone systems divide a large service area into a number of smaller discrete geographical areas called "cells" each typically ranging in size from about one-half to about twenty kilometers in diameter. Each cell is at least contiguous and/or overlapping with multiple adjacent cells to provide substantially continuous coverage throughout the service area. A base station including a plurality of transceivers capable of operating independently on different assigned radio frequencies is provided for each of the cells. Via the transceivers, the base stations engage in simultaneous communications with plural mobile stations operating within the area of the associated cell. The base stations further communicate via data links and voice trunks with a central control station, commonly referred to as a mobile switching center, which functions to selectively connect telephone calls to the mobile stations through the base stations and, in general, control operation of the system.

Each cell is assigned use of a predetermined set of frequencies from the cellular frequency band for use in providing its control and voice/data (traffic) channels. The assignment is typically made in accordance with a certain frequency plan. The frequencies used for the control and traffic channels assigned to a given cell are preferably spaced apart from each other across the frequency spectrum of the cellular frequency band. This serves to minimize the instances and adverse affects of adjacent channel interference.

Because only a limited number of frequencies are available in the cellular frequency band, the same frequencies that are assigned to one cell are also assigned to (i.e., reused by) other cells in distant parts of the service area. Typically, adjacent (i.e., neighbor) cells are not assigned to use the same frequency by the frequency plan. Furthermore, the power levels of the signal transmissions on any given frequency are limited in strength so as to limit propagation beyond the cell area. The foregoing precautions serve to reduce instances of co-channel interference caused by reuse of that same frequency in a distant cell. It is further noted that careful power level and distance assignment also assists in reducing instances of adjacent channel interference.

In spite of the precautions taken by service providers in the frequency plan assignment for a frequency reuse cellular telephone system and in the regulation of system operation, it is known that instances of co-channel interference do occur. This interference may be affected by a number of factors including: terrain irregularities; radio propagation changes; fading; multipath propagation; reflection; existence of human and natural obstructions; the number of available transceivers per cell; and variations in demand. This interference often adversely affects system operation by, for example, degrading voice quality on the traffic channels or interfering with the transmission and reception of control signals on the control channels. Service providers accordingly monitor on a cell by cell basis for instances of adjacent channel and co-channel interference on the assigned frequencies, as well as for instances of relatively low interference on other frequencies, and in response thereto make requests for a revision in the frequency plan assignment of frequencies for that cell. Before a retune, such a revision is often referred to in the art as a "proposal" for change.

Now that both digital, analog and dual mode systems are being implemented, the process for making and implementing a request for a revision in the frequency plan assignment is becoming more complicated. The primary reason for the added complication relates to the fact that certain frequencies in the cellular frequency band may be specified solely for use with analog control or traffic channels, while other frequencies are specified solely for use with digital control or traffic channels. Still other frequencies in the cellular frequency band may be specified for dual mode use. At the same time, the transceivers comprising the cell configuration of a cell may be assigned for either analog or digital control/traffic channel use. The heart of the problem resides in the fact that mode authorizations for the frequencies included in the proposal may not necessarily coincide with the mode capabilities of the transceivers. Accordingly, it is imperative that any revision in the frequency plan assignment take into account the specified modes of the frequencies within the proposal in the context of the specified operating modes of the transceivers for the cell configuration. Another problem lies in the fact that each cell evaluates interference, and makes requests for frequency plan assignment revisions by considering only its own needs, and failing to consider the effect of such assignment revisions on other cells within the network.

What is needed then is a method that validates from a frequency mode perspective the frequencies of a given proposal in view of the transceiver mode requirements of a given cell, and further coordinates the cell based requests for revision to the frequency plan assignment to the benefit of the each of the cells of the network rather than the benefit of just an individual cell. Preferably, this method should be implemented in an automatic fashion without need for service operator or service provider supervision (i.e., autonomously).

SUMMARY OF THE INVENTION

To address the foregoing and other concerns, the present invention comprises an autonomous tool and method for assigning frequencies to transceivers in cells of a cellular telephone system supporting analog and/or digital communications channels.

Communications quality related measurements (such as, for example, interference and bit error rate) are made on the uplink and downlink. The frequencies upon which downlink interference measurements are to be made are carefully selected and specified for implementation using mobile station mobile assisted hand-off (MAHO) functionality. The quality related measurements are appropriately filtered, and are then evaluated to identify potential candidates for reallocation. In one type of evaluation, when measured downlink quality (relating to bit error rate) on a selected frequency is lower than a threshold and is worse than measured uplink quality, then a better quality candidate is searched for and selected (if found) to replace the selected frequency. In another type of evaluation, when a best available candidate has better quality (relating to interference) than the quality of the worst selected frequencies, that best candidate is chosen to replace the selected frequency.

During the foregoing quality measurement and evaluation activities, the process recognizes situations where certain equipment (such as a transceiver) in a cell becomes blocked or is otherwise not operating. The allocated frequency for each such piece of equipment is marked and preserved by the process to prevent the frequency from being recognized as a potential candidate for selection during reallocation in other surrounding cells.

Further during the foregoing quality measurement and evaluation activities, the process recognizes instances where a transceiver is being removed from, or added to a cell. With respect to transceiver removal, swapping of selected frequencies within the cell is performed to retain the best measured quality frequencies. For transceiver addition, the foregoing quality measurement and evaluation activities are implemented to properly select frequencies for allocation to the cell.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

There are a plurality of radio frequencies in the cellular frequency band available to cellular telephone system providers for use in communicating with mobile stations. In an analog cellular telephone system, like the known advanced mobile phone service (AMPS) communications system, there is one frequency division multiple access (FDMA) analog communications (either control or traffic) channel per frequency. In a digital cellular telephone system, like the known D-AMPS or Global System for Mobile (GSM) communications systems, however, there are a plurality of time division multiple access (TDMA) digital communications channels (time slots) per frequency.

A cellular service area can cover a large geographic region, and in many instances there will be a need for a large number of cells. Often times, the number of cells needed exceeds the number of cells provided by dividing the available frequencies amongst the cells in such a manner as to handle expected subscriber usage per cell. In such a case there are simply not enough frequencies in the cellular frequency band for unique assignment to the included cells. In order then to provide sufficient call handling capacity throughout the service area, the cells are grouped into clusters of cells and the frequencies in the cellular frequency band are divided amongst and reused in each of the clusters in accordance with a certain frequency assignment plan.

Figure 1:
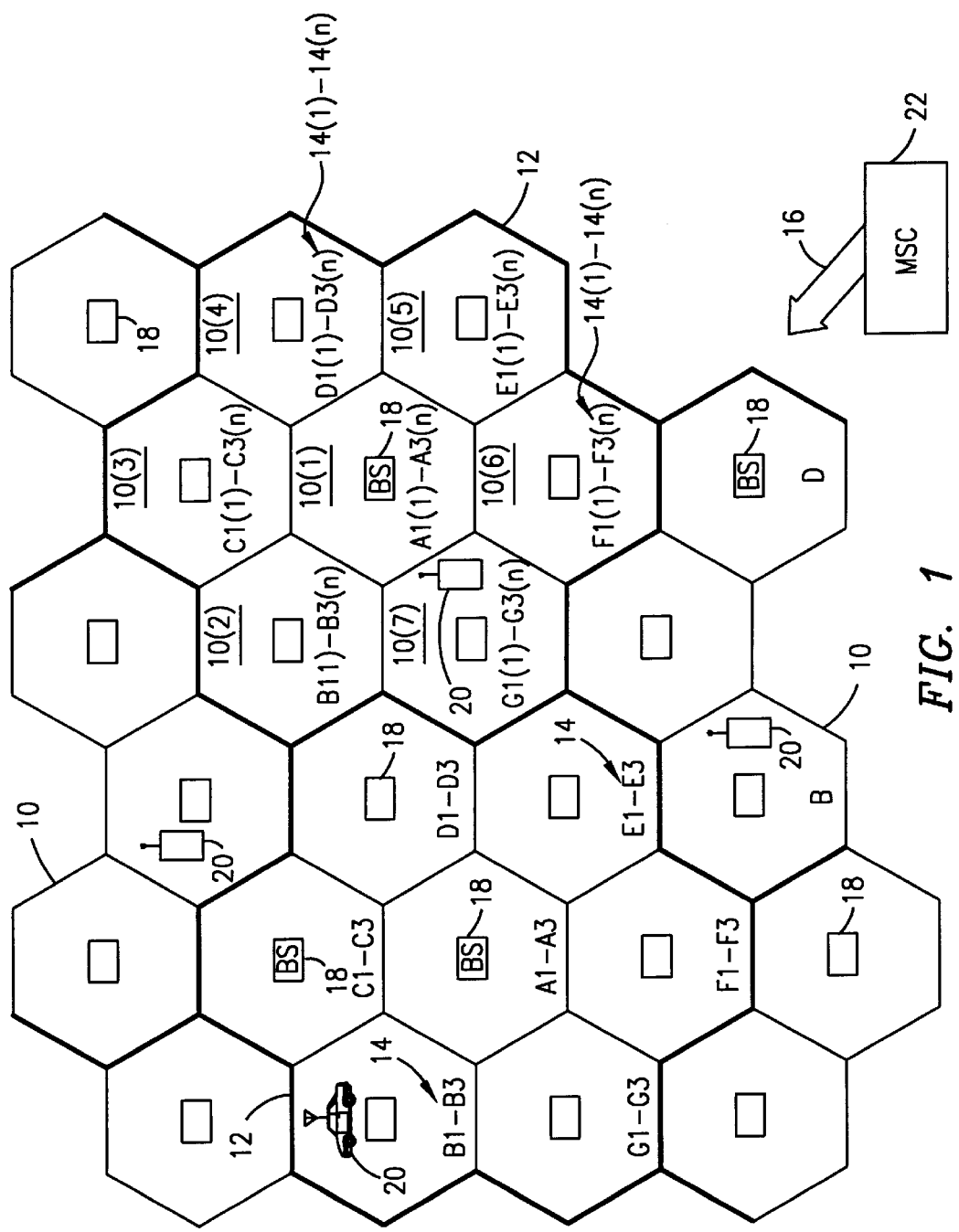
FIG. 1 is a cell diagram schematically illustrating an exemplary frequency plan assignment within a frequency reuse cellular telephone system.

Reference is now made to FIG. 1 wherein there is illustrated an exemplary cell structure and frequency plan assignment for use in a radio frequency reuse cellular telephone system. An arbitrary geographic region (hereinafter "the service area") is divided into a plurality of contiguous cells 10 schematically represented by hexagons. Although not specifically illustrated, each of the cells is sectorized to include three sub-cells. The cells 10 are then grouped into clusters 12 (outlined in bold to ease recognition). For example, in the frequency plan of FIG. 1, each cluster 12 includes seven cells 10(1)–10(7). It will, of course, be understood that each cluster 12 may have more or less cells 10 as required by the selected frequency plan.

The available frequencies in the cellular frequency band are divided in accordance with the frequency plan into frequency groups 14, with the frequency groups assigned amongst the cells 10 (including their sectors) of each cluster 12 such that the radio frequencies of the cellular band are reused in each cluster. For example, in a cell structure having seven cells 10 (with three sectors each) per cluster 12 like that shown in FIG. 1, there are seven frequency groups 14 identified and differentiated from each other by the alphabetic labels "A" through "G" corresponding to the cells 10(1)–10(7), respectively. Thus, each cell 10(1) in the service area is assigned use of radio frequencies of the cellular band in frequency group A1–A3, each cell 10(2) is assigned use of radio frequencies of the cellular band in frequency group B1–B3, and so on up to each cell 10(7) being assigned use of radio frequencies of the cellular band in frequency group G1–G3. Furthermore, each frequency group 14 is divided into a plurality (n) of sub-frequency groups 14(1) –14(n). Thus, frequency group A1 includes sub-frequency groups A1(1) through A1(n), frequency group B2 includes sub-frequency groups B2(1) through B2(n), and so on up through the sub-frequency groups G3(1) through G3(n) of frequency group G3.

It will be noted that in such a frequency plan, adjacent cells are typically not assigned use of the same frequency. Reuse of an identical frequency in the service area is preferably made with a separation of at least more than one cell 10 along with a regulation of broadcast power from each cell to constrain radio propagation substantially within the cell area. Furthermore, it will be noted that typically no one cell 10 utilizes adjacent frequencies in the cellular band. Adjacent frequencies are preferably assigned no closer than one cell 10 away from each other. By arranging the cells 10 in clusters 12 as shown in FIG. 1, regulating broadcast power of communications within the cell as mentioned above, and further by assigning frequencies in the fashion mentioned above, the likelihood of interference is reduced while simultaneously providing effective cellular communications services across a very large service area.

Each of the cells 10 in a cellular telephone system such as that illustrated in FIG. 1 includes at least one base station (BS) 18 configured to facilitate radio frequency communications with mobile stations 20 moving throughout the service area. The base stations 18 are illustrated as being positionally located at or near the center of each of the cells 10. However, depending on geography and other known factors, the base stations 18 may instead be located at or near the periphery of, or otherwise away from the centers of, each of the cells 10. In such instances, the base stations 18 may broadcast and communicate with mobile stations 20 located within the cells 10 using directional rather than omni-directional antennas. The base stations 18 are connected by communications links (generally shown by arrow 16) to at least one mobile switching center (MSC) 22 operating to control the operation of the system for providing cellular communications with the mobile stations 20. Each base station 18 includes a plurality of transceivers (not shown) capable of operating independently on different radio frequencies assigned to the cell. Operation of the mobile switching center 22 and base station 18 to provide cellular telephone service is well known to those skilled in the art, and will not be described.

In spite of the precautions taken to avoid interference, it is known that interference does occur in cellular systems like that previously described. One aspect of this interference originates from adjacent frequency communications occurring simultaneously in cells 10 of the same or other clusters 12 (i.e., adjacent channel interference). Another aspect of this interference originates from same frequency communications occurring simultaneously in the cells 10 of other clusters 12 (i.e., co-channel interference). To combat this interference, the cellular service provider often engages in occasional revisions of the frequency plan wherein one or more frequencies (comprising sub-frequency groups 14(n) or frequency groups 14) assigned to a cell 10 are dropped in favor of the addition of one or more other frequencies (comprising sub-frequency groups or frequency groups) contained within the cellular band. In this regard, the frequencies (in a sub-frequency group 14(n) or frequency group 14) assigned by a current version of the frequency plan to a given cell comprise "selected" frequencies with respect to that given cell, and all other frequencies in the cellular band, which are normally selected frequencies for other cells, comprise "candidate" frequencies that could possibly be assigned to that given cell as a result of the revision in the frequency plan. The point of the revision then is to delete one or more of the selected frequencies (comprising sub-frequency groups 14(n) or frequency groups 14) for a cell which are interfered, and assign in place thereof a corresponding one or more un-interfered or less-interfered candidate frequencies (from other sub-frequency groups or frequency groups). In many cases, however, such a revision in the frequency plan with respect to a given cell 10 fails to take into consideration the effect the revision may have on other cells of the cellular telephone system.

Open Loop Processing

Figure 2:
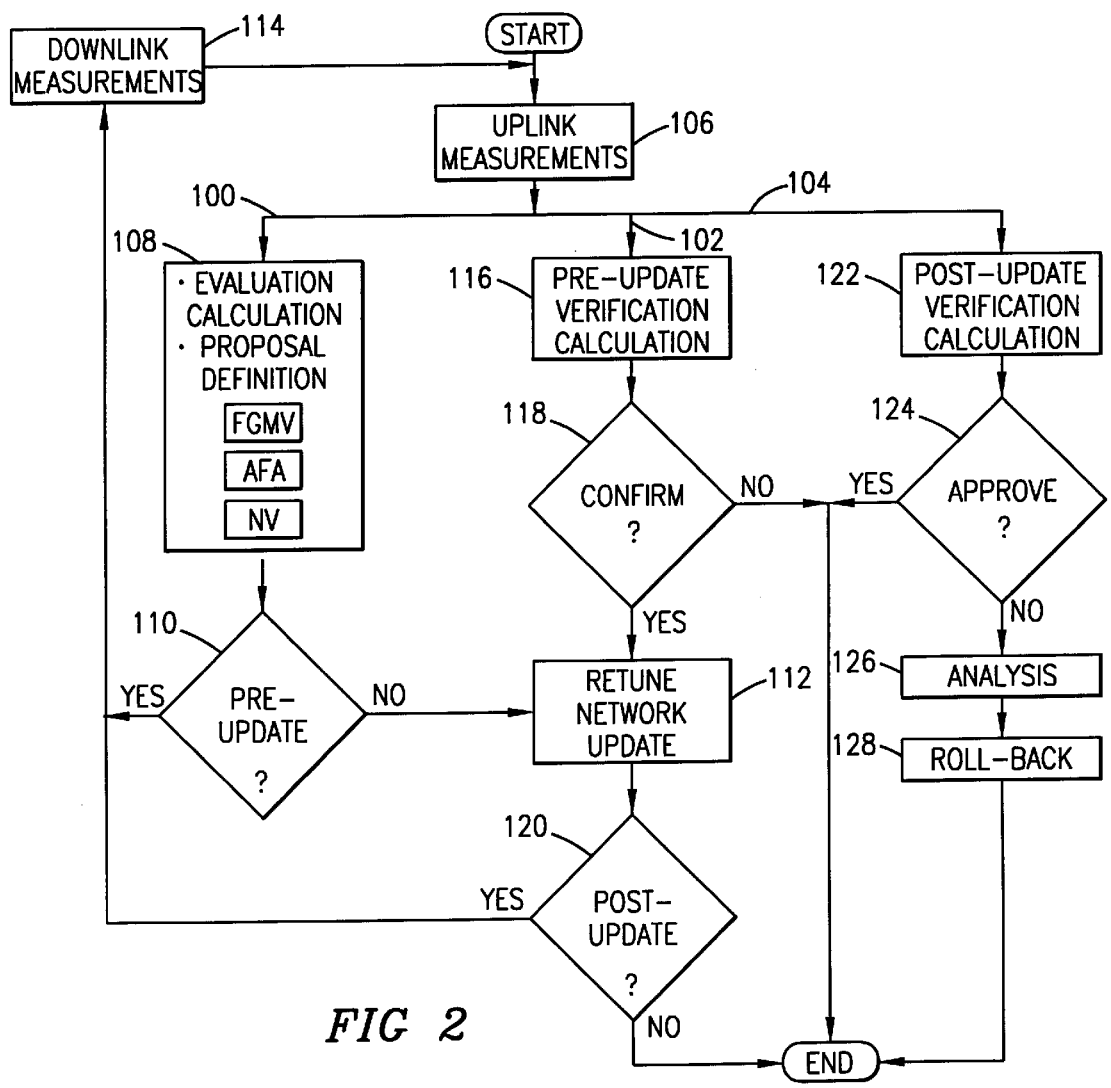
FIG. 2 is a flow diagram for an "open loop" procedure of the present invention for effectuating a revision in a frequency plan for a cellular telephone system.

Reference is now made to FIG. 2 wherein there is shown a flow diagram for an "open loop" procedure of the present invention to effectuate a revision in a frequency plan for a cellular telephone system. By "open loop" it is meant that the procedure operates in an interactive manner with the participation and supervision of a network service operator or service provider (i.e., in a non-autonomous manner). The open loop procedure, in general, comprises a three-pass operation. A first pass, identified generally by arrow 100, is referred to as evaluation. The evaluation pass 100 is always performed, and involves the creation of one or more proposals by the operator for one or more cells in response to the consideration of radio environment statistics measurements which report uplink interference measurements and uplink/downlink bit error rate measurements. These created proposals are designed to effectuate a revision in the frequency plan by deleting one or more of the selected frequencies (comprising sub-frequency groups 14(n) or frequency groups 14) for a cell which are interfered, and assigning in place thereof a corresponding one or more un-interfered or less-interfered candidate frequencies (from other sub-frequency groups or frequency groups). A second pass, identified generally by arrow 102, is referred to as pre-update verification. The pre-update verification pass 102 is performed at the option of the operator, and involves the confirmation of no more than one proposals for each of the one or more cells determined in the evaluation pass 100 in response to the consideration of downlink interference measurements in addition to the re-consideration of uplink interference measurements and uplink/downlink bit error rate measurements. A third pass, identified generally by arrow 104, is referred to as post-update verification. The post-update verification pass 104 is performed at the option of the operator, and involves the verification, following network update in accordance with one of the proposals, that interference levels following network update are satisfactory.

A typical execution of the open loop procedure may be described as follows. First, uplink interference measurements and uplink/downlink bit error rate measurements are taken in step 106. These measurements are taken using a conventional radio environment statistics recording function supported by the network. The radio environment statistics data is then parsed and stored in a relational database. The data is also validated to confirm its consistency with respect to the number of samples used. The open loop procedure then enters the evaluation pass 100 where evaluation calculations based on the measurements are made in order to rank candidate and selected sub-frequency groups. The operator may then interactively participate in the process by selecting, from amongst all of the ranked candidate sub-frequency groups, those particular candidate sub-frequency groups for potential assignment to a given cell, and also for de-selecting, from amongst all of the ranked selected sub-frequency groups, those particular selected sub-frequency groups for potential removal from that given cell (action 108). Certain special construction aids (to be described) are utilized by the operator at this point to assist in the selection process. This selection activity by the operator comprises the generation of a proposal. More than one proposal per cell, and more than one cell per evaluation pass 100, may be placed under consideration by the operator. At this point, the proposal is validated against certain validation rules (e.g., mobile network configuration check rules concerning channel allocation—such as channel separation and potential intermodulation products—and data required for hand-off). The operator then has the option (step 110) to request pre-update verification (through pass 102) for each of the created proposals. The pre-update verification pass 102 assists the operator in identifying unacceptable proposals, and narrowing proposals options such that there is only one (best or preferred) proposal per cell prior to update. Because current analog mobile station technology does not support the making and reporting of downlink interference measurements, pre-update verification is only authorized for networks that are either digital or dual mode in nature. If pre-update verification is not selected, the procedure implements the network update in accordance with the created proposals (step 112), provided no more than one proposal per cell exists. If, on the other hand, the operator selects pre-update verification, downlink interference measurements are made in step 114. Furthermore, the procedure loops back around and additional uplink interference measurements and uplink/downlink bit error rate measurements are made (step 106). Pre-update verification calculations based on the uplink and downlink measurements are then made in step 116 to allow the user to confirm the viability of the considered proposals, and then cancel or confirm the proposals in accordance with their determined viability. A determination is then made in step 118 as to whether the proposal was confirmed in pre-update verification. If yes, the procedure implements the network update in accordance with the accepted proposal (step 112). It is noted here that the network update may either be handled autonomously by the network in accordance with known techniques, or may be manually implemented, as desired. If, on the other hand, the proposal was not accepted, the procedure ends. Following implementation of the network update through a retune in step 112, the operator then has the option (step 120) to request post-update verification (through pass 104) for each of the accepted and implemented proposals. The post-update verification pass 104 assists the operator in identifying implemented (i.e., deployed) proposals that do not satisfactorily reduce interference and improve network operation. If post-update verification is not selected, the procedure ends. If, on the other hand, the operator selects post-update verification, the procedure loops back around to make additional downlink interference measurements (step 114) and additional uplink interference measurements and uplink/downlink bit error rate measurements (step 106). Post-update verification calculations based on the uplink and downlink measurements are then made in step 122 to confirm the acceptability of the deployed proposals (i.e., did the changes in the network produce the expected results concerning uplink interference with respect to the cell itself and its co-channel cells) The operator is then given the option (step 124) to confirm the deployed proposal. If confirmed, the procedure ends. If not confirmed, perhaps because the expected results were not obtained, an analysis is made by the operator in step 126 concerning which of the deployed proposals should be abandoned. Once these one or more proposals are identified, the network implements a roll-back in step 128 to return each cell affected by an unacceptable deployed proposal back to its original configuration state prior to the step 112 network update. It is noted here that prior to roll-back, the operator may perform a network effect and mobile network configuration check.

Figure 3:
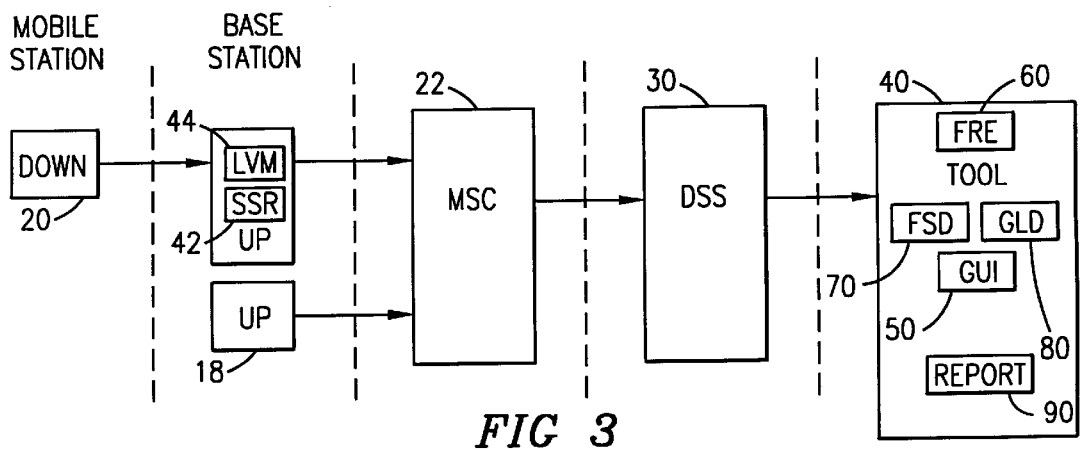
FIG. 3 is a block diagram of a portion of the cellular network of FIG. 1.

Reference is now made to FIG. 3 wherein there is shown a block diagram of a portion of the cellular network of FIG. 1. The network includes a base station 18 for each cell in communication with mobile stations 20. The base stations 18 are each connected to a single mobile switching center 22. The mobile switching centers 22 are connected to an operation support system (OSS) 30. Finally, in accordance with the present invention, the operation support system 30 is connected to (or is incorporated in) an interactive frequency planning tool 40. Using this interactive frequency planning tool, and implementing the procedure set forth in FIG. 2 and described above, an operator may evaluate network performance, select proposals for retune, and control frequency planning.

Each base station includes a signal strength receiver (SSR) 42 and a location verification module (LVM) 44. Using the signal strength receiver 42 and/or a location verification module 44, the network collects uplink interference measurements on candidate frequencies (see, step 106, FIG. 2). Filtering of these measurements is performed in the base station 18 itself before being reported back to the mobile switching center 22 and passed on to the frequency planning tool 40 through the operating support system 30. Utilizing the mobile assisted hand-off (MAHO) measurement functionality of the mobile stations 20, downlink interference measurements are made on the candidate frequencies (see, step 114, FIG. 2). Filtering of these measurements is performed in the mobile switching center 22 before being reported back to the frequency planning tool 40 through the operating support system 30. The uplink bit error rate measurements on selected frequencies are made by the base stations 18 on the digital voice channels (see, step 106, FIG. 2) and are reported to the operating support system 30 through the mobile switching center 22. The downlink bit error rate measurements on selected frequencies are made by the mobile stations 20 on the digital voice channels (see, step 106, FIG. 2) and are reported to the operating support system 30 through the base station 18 and the mobile switching center 22. Filtering of these bit error rate measurements is performed in the operating support system 30, with the filtered information reported to the frequency planning tool 40. The uplink analog interference measurements on selected frequencies are made by the base stations 18 on the analog voice channels (see, step 106, FIG. 2) and are reported to the operating support system 30 through the mobile switching center 22. Filtering of these uplink interference measurements is performed in the operating support system 30, with the filtered information reported to the frequency planning tool 40. Finally, the uplink digital interference measurements on selected frequencies are made by the base stations 18 on the digital voice channels (see, step 106, FIG. 2). Filtering of these measurements is performed in the base station 18 itself before being reported back to the mobile switching center 22 and passed on to the frequency planning tool 40 through the operating support system 30.

Reference is now once again made to FIG. 2 for a more detailed explanation of the open loop procedure. Attention is first directed to the process implemented in connection with the making of uplink interference measurements and uplink and downlink bit error rate measurements in step 106. A number of measurement periods (e.g., up to four per day) are defined by the system operator. It is within each of these defined measurement periods that the radio environment statistics measurements and mobile assisted hand-off measurements are made for purposes of frequency planning. For each of the calculations performed by the procedure (see, steps 108, 116 and 122), the operator may select not only which one or ones of the measurement periods should be used, but also the total number of measurement periods that must be completed before the calculation is executed. Furthermore, the operator may selectively use more than one measurement period, if desired, in order to gain more confidence in the measurements. The operator may further specify that the step 106 measurements are to be performed with respect to the cells associated with only certain ones of the mobile switching centers in the network. Furthermore, in connection with network that supports multiple operation types (e.g., AMPS, D-AMPS 800 MHz, D-AMPS 1900 MHz, or Down Banded Cellular (DBC)), the operator may select which one or ones of the network types should have measurements performed. The action of step 106 further determines which radio characteristic(s) should be used in making the radio environment statistics measurements based upon frequency ranges (i.e., hyperband) and the network type (AMPS, D-AMPS, DBC).

Attention is next directed to the process for making the evaluation calculation of step 108. Depending on the mode of the sub-frequency group involved, the following is calculated. For selected sub-frequency groups containing only analog voice channels, calculate:

(a) $I_{up\_sel\_freq\_eval}$: the uplink interference value for a frequency assigned to an analog voice channel using data obtained from an appropriately selected radio characteristic plus P2 plus P3. wherein:
    P2 is a systematic difference parameter defining a margin to be added to the analog voice channel measurements (and perhaps a compensation factor to account for dual mode sub-frequency groups); and
    P3 is a systematic difference parameter defining a margin between analog and digital measurements; and
  (b) $I_{up\_sel\_eval}$: the average uplink interference value for the sub-frequency group comprising the straight average of the $I_{up\_sel\_freq\_eval}$ values for each voice channel in the sub-frequency group.

For selected sub-frequency groups containing only digital voice channels, calculate:

(c) $I_{up\_sel\_freq\_eval}$: the uplink interference value for a frequency assigned to a digital piece of channel equipment comprising the average of the filtered value for each digital voice channel connected to that piece of channel equipment using data obtained from an appropriately selected radio characteristic plus P1, wherein:
    P1 is a systematic difference parameter defining a digital margin to be added to the digital traffic channel measurements taking into consideration the hyperband being used by the sub-frequency group;
  (d) $I_{up\_sel\_eval}$: the average uplink interference value for the sub-frequency group comprising the straight average of the $I_{up\_sel\_freq\_eval}$ values for each digital piece of channel equipment in the sub-frequency group;
  (e) $BER_{up\_freq\_eval}$: the uplink bit error rate for a frequency assigned to a digital piece of channel equipment comprising the average of the filtered value for each digital voice channel connected to that piece of channel equipment using data obtained from an appropriately selected radio characteristic;
  (f) $BER_{up\_eval}$: the average uplink bit error rate value for the sub-frequency group comprising the straight average of the $BER_{up\_freq\_eval}$ values for each digital piece of channel equipment in the sub-frequency group;
  (g) $BER_{dn\_freq\_eval}$: the downlink bit error rate for a frequency assigned to a digital piece of channel equipment comprising the average of the filtered value for each digital voice channel connected to that piece of channel equipment using data obtained from an appropriately selected radio characteristic; and
  (h) $BER_{dn\_eval}$: the average downlink bit error rate value for the sub-frequency group comprising the straight average of the $BER_{dn\_freq\_eval}$ values for each digital piece of channel equipment in the sub-frequency group.

For selected sub-frequency groups containing both analog and digital voice channels, calculate:

$I_{up\_sel\_eval}$ the average uplink interference value, comprising:

$$I_{up\_sel\_eval} = (\text{SUM}(I_{up\_selfreq\_eval(digital)} + P1) + \text{SUM}(I_{up\_sel\_freq\_eval(analog)} + P2 + P3))/(m+n)$$

wherein:

$I_{up\_sel\_freq\_eval(digital)}$ is the average of the values reported by the digital voice channels using a frequency of that sub-frequency group;
  $I_{up\_sel\_freq\_eval(analog)}$ is the average of the values reported by the analog voice channels using a frequency of that sub-frequency group;
  n is the number of analog frequencies in the sub-frequency group;
  m is the number of digital frequencies in the sub-frequency group;
  P1, P2 and P3 are as defined above;
  (j) $BER_{up\_eval}$ (see, item (f) above); and
  (k) $BER_{dn\_eval}$ (see, item (h) above).

Furthermore, $I_{up\_sel\_w\_eval}$, $BER_{up\_w\_eval}$ and $BER_{dn\_w\_eval}$ shall be calculated on a cell level using the selected sub-frequency groups with the average weighted by the number of frequencies in each sub-frequency group.

For the candidate sub-frequency groups, calculate:

(l) $I_{up\_cand\_freq\_eval}$: the uplink interference value for a frequency; and
  (m) $I_{up\_cand\_eval}$: the average uplink interference value for the sub-frequency group comprising the straight average of the $I_{up\_cand\_freq\_eval}$ values for each frequency in the sub-frequency group.

Reference is once again made to FIG. 3. Utilizing a graphical user interface 50 of the frequency planning tool 40, an operator may view the (a)–(m) results of the FIG. 2, step 108 evaluation process. Standard graphical user interface controls are supported for controlling the viewing options and changing the information to be viewed. Furthermore, support is provided, although not shown, for having centralized processing of information by the tool 40, with distributed multi-terminal graphical user interfaces 50 for operator manipulation.

Concerning an operator selected mobile switching center, a list of all the cells associated with that mobile switching center is presented through the interface 50. This list is sorted for display in decreasing order of $I_{up\_sel\_w\_eval}$ (but may alternatively be sorted in decreasing order of worst $I_{up\_sel\_eval}$). On a cell level, information may be obtained through user interface 50 interaction concerning, for example, cell name, $I_{up\_sel\_w\_eval}$, $BER_{up\_w\_eval}$ and $BER_{dn\_w\_eval}$. Upon selection of particular cell from the list, sub-frequency group information may be obtained through user interface 50 interaction concerning, for example, sub-frequency group name, mode, number of assigned/available frequencies, $I_{up\_sel\_eval}$, $BER_{up\_eval}$ and $BER_{dn\_eval}$. Still further, upon selection of particular sub-frequency group from the list, channel information may be obtained through user interface 50 interaction concerning, for example, channel number, channel equipment assignment, $I_{up\_sel\_freq\_eval}$, $BER_{up\_freq\_eval}$ and $BER_{dn\_freq\_eval}$. The graphical user interface 50 further supports the highlighting of certain data in the cell list comprising:

cells having an $I_{up\_sel\_w\_eval}$ within a certain operator selected range;

cells having its worst $I_{up\_sel\_eval}$ within a certain operator selected range;

cells having a $BER_{up\_w\_eval}$ within a certain operator selected range;

cells having a $BER_{dn\_w\_eval}$ within a certain operator selected range; and cells having a BER difference ($BER_{dn\_w\_eval}$–$BER_{dn\_w\_eval}$) within a certain operator selected range.

Furthermore, concerning a cell selected from the cell list, a candidate list containing all of the sub-frequency groups of the same frequency set is displayed by the graphical user interface 50. This candidate list is sorted in increasing order of $I_{up\_cand\_eval}$, sub-sorted by orientation (for sectorized cells) and starting with the same orientation as the sub-frequency group for the selected cell. Candidate sub-frequency group information may be obtained through user interface 50 interaction concerning, for example, candidate sub-frequency group name, orientation, permission of the sub-frequency group, number of assigned/available frequencies, $I_{up\_cand\_eval}$, and presence of analog/digital control channel. The graphical user interface 50 further supports the highlighting of certain data in the candidate sub-frequency group list comprising:

show sub-frequency groups with either an analog or digital permission;

show sub-frequency groups with $I_{up\_cand\_eval}$ within a certain operator selected range;

show sub-frequency groups having a certain number of frequencies; and show sub-frequency groups either having or not having an analog or digital control channel frequency. Still further, upon selection of particular candidate sub-frequency group from the list, uplink interference information for each single frequency therein may be obtained through user interface 50 interaction comprising, for example, $I_{up\_cand\_freq\_eval}$.

Using the foregoing information available to the operator through manipulation of the graphical user interface 50, a proposal for the cell may be constructed and laid out in a cell definition list. Each proposal is labeled, and the sub-frequency groups comprising the proposal are identified. Information concerning the candidate sub-frequency groups in the proposal may be obtained through user interface 50 interaction concerning, for example, candidate sub-frequency group name, orientation, permission of the sub-frequency group, number of assigned/available frequencies, $I_{up\_cand\_eval}$, presence of analog/digital control channel and top/down/best frequency assignment type. Along with this information, the number of unassigned devices in each sub-frequency group are displayed.

During proposal definition, a sub-frequency group may be selected from the cell definition list and moved to the candidate list by actuating a delete feature. Furthermore, during proposal definition, a sub-frequency group may be selected from the candidate list and moved to the cell definition list by actuating an add feature. Furthermore, an exchanging of sub-frequency groups between the cell definition list and the candidate list by actuating a swap feature.

It is recognized that the frequencies within a sub-frequency group are typically used for only certain types of communications. Accordingly, each sub-frequency group is assigned with an operating permission tag defining the permitted types of communications for which the frequencies within the sub-frequency group may be used. For example, at a high level, the permission may relate to the permitted use of the frequencies within the sub-frequency group for certain modes of communication such as digital communications (i.e., digital control and/or traffic channels), analog communications (i.e., analog control and/or traffic channels), or dual mode communications (i.e., analog or digital). More precisely, the permission may permit additional or alternative use in connection with other modes of communication, such as facsimile transmission, cellular digital packet data (CDPD), asynchronous data transmission, and the like.

It is also recognized that most service providers/operators implement sectorized cells 10, and assign frequency groups (including sub-frequency groups) on a sector by sector basis. With frequency reuse, a corresponding frequency group is typically assigned to a correspondingly oriented sector in order to minimize the likelihood of interference. Accordingly, each frequency group is assigned with a tag relating to its orientation. This tag then identifies the preferred, but not necessarily required, sector orientation with which the frequency groups should be used. Orientation information may then be used for filtering and sorting activities.

It is still further recognized that certain frequencies are assigned for use with certain types of communications channels. For example, a frequency may be used in the cellular telephone system for an analog control channel (ACC). Another frequency may include a time slot dedicated for use as a digital control channel (DCC). Accordingly, each frequency is assigned with a tag specifying its channel assignment (e.g., ACC, DCC, analog traffic, digital traffic, or analog/digital traffic).

With reference once again to FIG. 2, following the creation of a proposal in the manner set forth above, a verification of the proposal may be obtained in connection with the step 108 evaluation calculation by implementing a frequency group mode validation (FGMV) functionality (step 140), an automatic frequency assignment (AFA) functionality (step 150) and a network validation (NV) check (step 160).

The frequency group mode validation functionality of step 140 determines whether the candidate sub-frequency groups within the proposal for a given cell are valid (i.e., they fit) with respect to the current configuration of that cell and in particular its base station. It is remembered here that the base station for each cell includes a plurality of transceivers (channel equipment) capable of operating independently on different assigned radio frequencies and with a given mode. The number and operating capabilities of the included transceivers define the current cell configuration.

Figure 4:
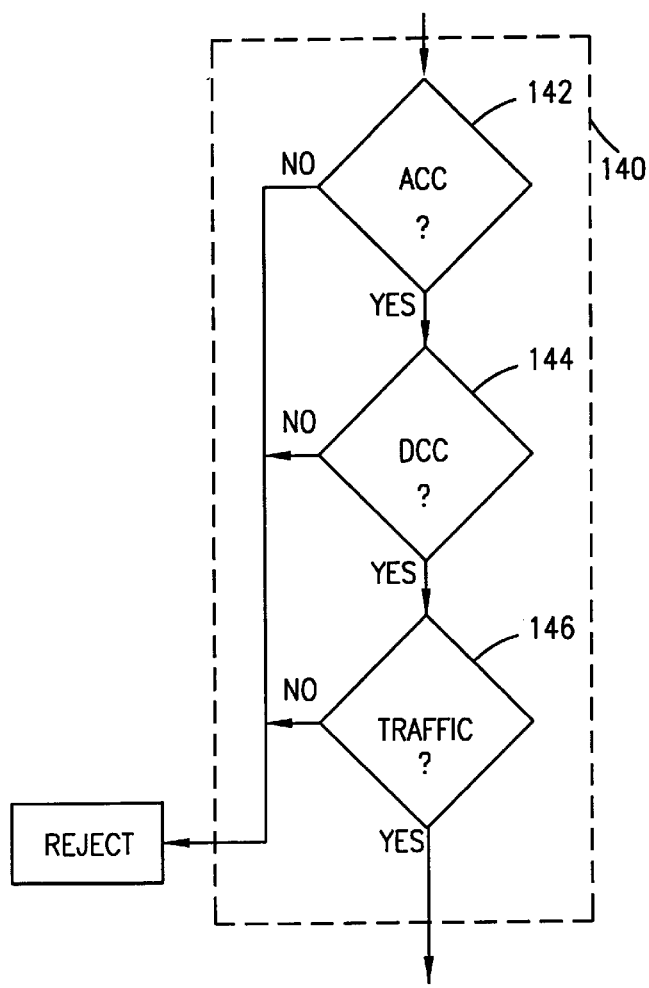
FIG. 4 is a flow diagram for a frequency group mode validation process within the procedure of FIG. 2.

The frequency group mode validation determination of step 140 is illustrated in FIG. 4 and involves first determining in step 142, whether the frequencies of the sub-frequency groups included in the proposal include a frequency having a tag specifying its channel as an analog control channel. Note, however, that this is a requirement only if the current cell configuration specifies the use of an analog control channel. Next, in step 144, a determination is made as to whether the sub-frequency groups included in the proposal include a digital control channel operating permission tag such that one of the frequencies therein either is specified, or could be specified, for use as a digital control channel. Note here that this is a requirement only if the current cell configuration specifies the use of a digital control channel. Finally, in step 146, a determination is made as to whether the sub-frequency groups included in the proposal include traffic channels with operating permission tags (analog, digital, data facsimile, CDPD, and the like) that satisfy the operating mode requirements of the included transceivers within the current cell configuration. This step 146 may further confirm that the sub-frequency groups of the proposal are approved for the sector orientations of the cell.

If the determination of either step 142, step 144 or step 146 is negative, then the proposal is rejected. Otherwise, if the determination of each step 142, 144, and 146 is affirmative, then the proposal passes frequency group mode validation testing.

Figure 5:
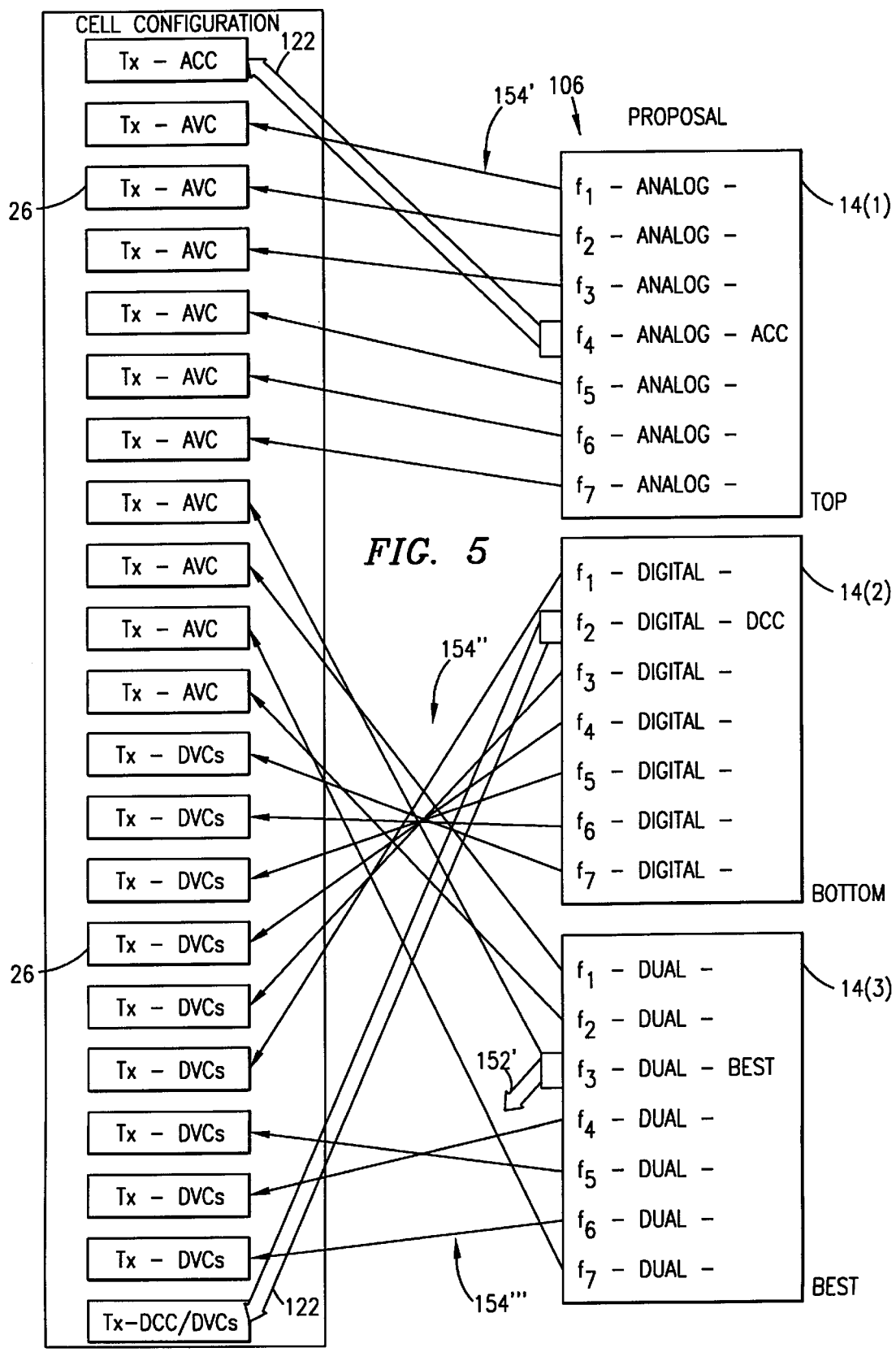
FIG. 5 is an illustration of an exemplary implementation of the frequency mode validation process and an automatic frequency assignment process.

The operation of the frequency group mode validation determination process (step 140) may be better understood by reference to a specific example illustrated in FIG. 5. On the left hand side of FIG. 5 is shown the current cell configuration for an exemplary cell including a plurality (twenty-one shown) of transceivers (TX) 26 providing an analog control channel (ACC), a plurality of analog voice (traffic) channels (AVCs), a plurality of digital voice (traffic) channels (DTCs), and a digital control channel (DCC). On the right hand side of FIG. 5 is shown a proposal that is being considered. Three candidate sub-frequency groups 14(1)–14(3) are included in the proposal. Each sub-frequency group 14(1)–14(3) includes seven frequencies f1—f7. It will, of course, be understood that each sub-frequency group may have as many frequencies as is desired including as few as one.

The cell configuration includes a transceiver 26 providing an analog control channel (ACC). Accordingly, step 142 is executed to determine whether the frequencies of the sub-frequency groups 14(1)–14(3) included in the proposal include a frequency having a tag specifying its channel as an analog control channel. In this case, the first sub-frequency group 14(1) has an operating permission tag of "analog", and one of its included frequencies $f_4$ is specified for use as an analog control channel ($f_{ACC}$).

The cell configuration includes a transceiver 26 providing a digital control channel (DCC). Accordingly, assuming that step 142 is passed, step 144 is executed to determine whether the frequencies of the sub-frequency groups 14(1) –14(3) included in the proposal include a frequency having a tag specifying its channel for use as a digital control channel. In this case, the second sub-frequency group 14(2) has an operating permission tag of "digital", and one of its included frequencies $f_2$ is specified for use as a digital control channel ($f_{DCC}$). If none of the included frequencies f specifies use as a digital control channel, the process determines whether any of the frequencies within either a digital or dual mode sub-frequency group could be specified for use as a digital control channel. This is illustrated in FIG. 5 by the identification of frequency $f_3$ in sub-frequency group 14(3) as the best frequency for potential use as a digital control channel ($f_{DCC}$).

The next step 146 of the frequency mode validation determination process determines whether the sub-frequency groups 14(1)–14(3) included in the proposal include enough traffic channels to match the operating mode requirements of the included transceivers 26. The current cell configuration requires ten analog traffic channels for the analog transceivers 26 and sufficient digital traffic channels for the ten digital transceivers. The process of step 146 identifies whether the proposal includes sub-frequency groups 14(n) having operating permission tags sufficient to meet the cell configuration requirements. For example, if the three sub-frequency groups 14(1)–14(3) of the proposal each had an operating permission tag of "analog" (not shown), the process of step 146 would be failed and the proposal rejected because the proposal could not satisfy the digital traffic channel needs of cell. Conversely, as shown, if the first sub-frequency group 14(1) had an operating permission tag of "analog", the second sub-frequency group 14(2) had an operating permission tag of "digital", and the third sub-frequency group 14(3) had an operating permission tag of "dual", the process of step 146 would be passed because the traffic channel needs of the cell could be met.

Figure 6:
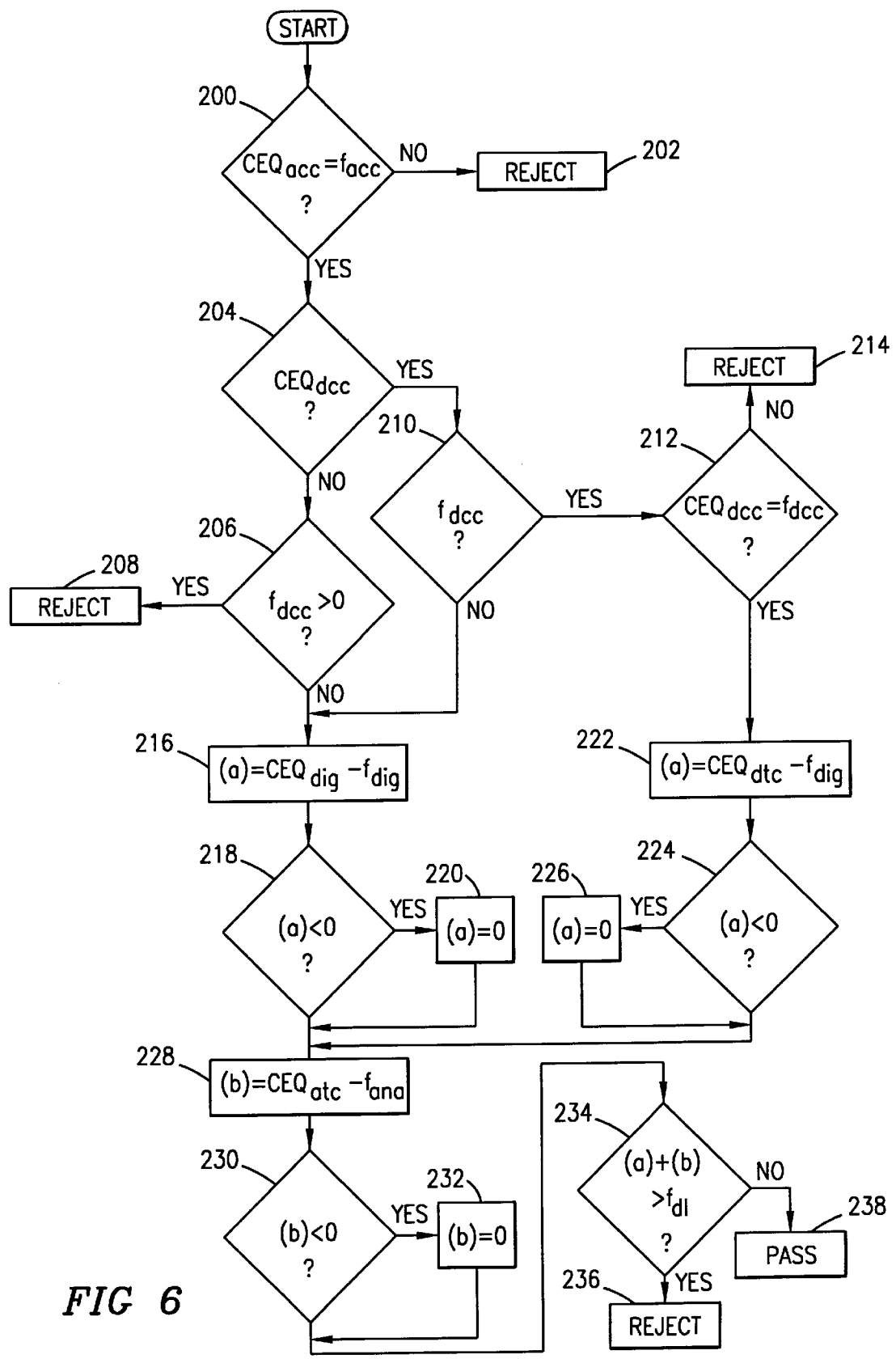
FIG. 6 is a flow diagram for a mathematical implementation of the frequency group mode validation process.

The frequency group mode validation process of step 140 may be mathematically represented and implemented as shown in the flow diagram of FIG. 6. The first step 200 is to determine whether the number of analog control channels (i.e., analog control channel specified transceivers) in the cell configuration ($CEQ_{acc}$) equals the total number of frequencies in the included sub-frequency groups of the proposal which have an analog control channel tag ($f_{acc}$) If not, the proposal is rejected in step 202. If yes, it is next determined in step 204 whether there are any digital control channels (i.e., digital control channel specified transceivers) in the cell configuration ($CEQ_{dcc}$). If no, a determination is made in step 206 as to whether there are any frequencies in the included sub-frequency groups of the proposal which have a digital control channel tag ($f_{dcc}$) If yes, the proposal is rejected in step 208.

If the determination of step 204 is affirmative (i.e., there is a digital control channel in the cell configuration), a determination is made in step 210 as to whether the cell configuration specifies a digital control channel tag ($f_{dcc}$). If yes, it is desirable to enforce this tag, and a determination is made in step 212 as to whether the number of digital control channels (i.e., digital control channel specified transceivers) in the cell configuration ($CEQ_{dcc}$) equals the total number of frequencies in the included sub-frequency groups of the proposal which have a digital control channel tag ($f_{dcc}$). If not, the proposal is rejected in step 214.

If the determinations of either step 206 or step 210 are negative, the procedure next moves to step 216 and calculates (a) which is the total number of digital specified transceivers ($CEQ_{dig}$) in the cell configuration minus the number of frequencies in the included sub-frequency groups of the proposal which have a digital operating permission tag ($f_{dig}$). If the result is negative (step 218), (a) is set equal to zero in step 220. If, on the other hand, the determination of step 212 is affirmative, the procedure instead moves to step 222 and calculates an alternative (a) which is the total number of digital traffic channel specified transceivers ($CEQ_{dtc}$) in the cell configuration minus the number of frequencies in the included sub-frequency groups of the proposal which have a digital operating permission tag ($f_{dig}$) If the result is negative (step 224), (a) is set equal to zero in step 226. Following the calculations of either steps 216–220 or steps 222–226, the procedure moves to step 228 to calculate (b) which is the total number of analog traffic channel specified transceivers ($CEQ_{atc}$) in the cell configuration minus the number of frequencies in the included sub-frequency groups of the proposal which have an analog operating permission tag ($f_{ana}$). If the result is negative (step 230), (b) is set equal to zero in step 232. The next step 234 is to determine if the sum of (a)+(b) is greater than the number of frequencies in the included sub-frequency groups of the proposal which have a dual operating permission tag ($f_{dl}$) and are capable of use as either a digital traffic channel or an analog traffic channel. If yes, the proposal is rejected in step 236. If no, the proposal passes (step 238) the frequency mode validation process of step 140.

Following rejection of the proposal by the frequency group mode validation process of step 140, the operator may return to the evaluation calculation step 108 of FIG. 2 to make further evaluations of the frequency groups and definition of proposals for verification.

Figure 7:
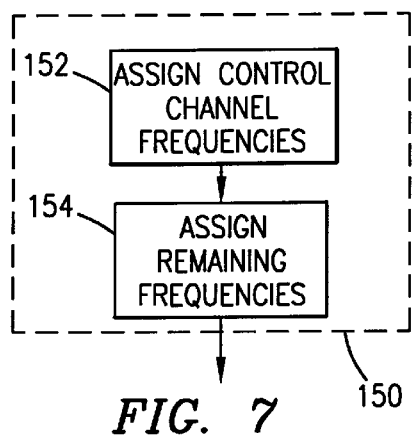
FIG. 7 is a flow diagram for the automatic frequency assignment process within the procedure of FIG. 2.

The purpose of the automatic frequency assignment of the sub-frequencies within the candidate sub-frequency groups (step 150) is to distribute the frequencies within the candidate sub-frequency groups of the proposal to the transceivers of the current cell configuration. The automatic frequency assignment process is shown in FIG. 7 and involves first assigning in step 152 the frequencies relating to the transceivers for the control channels for the cell. With respect to the analog control channel for the cell, the assigned frequency is the frequency in a sub-frequency group of the proposal having a tag specifying its channel as an analog control channel. With respect to the digital control channel, the assigned frequency is the frequency in a sub-frequency group of the proposal having a tag specifying support of a digital control channel. If no such frequency exists, then the best (e.g., lowest uplink interference $I_{UP}$) frequency having a digital (or perhaps dual) operating permission tag is selected. Next, in step 154, the remaining frequencies within the sub-frequency groups of the proposal are assigned to the remaining transceivers for the cell. The order with which the assignments are made in step 154 is defined by a service provider/operator selected parameter. For example, the parameter may specify top, bottom or best for the assignment order. If top is specified, the frequencies are assigned from each sub-frequency group to a transceiver of the cell in accordance with their top to bottom numerical ordering within the sub-frequency group. If bottom is specified, the frequencies are assigned from each sub-frequency group to a transceiver of the cell in accordance with their bottom to top numerical ordering within the sub-frequency group. If best is specified, the frequencies are assigned from each sub-frequency group to a transceiver of the cell in accordance with the best (i.e., lowest uplink interference $I_{UP}$) available frequency. of course, the assignment performed in step 154 takes into account the operating permission tags of the sub-frequency groups from which the frequencies are taken in view of the specified type of operation for the cell transceivers. Furthermore, it is understood that this assignment is still at this point hypothetical in that it has not yet been physically implemented through a retune of the cell. It will, of course be understood that unlike that shown in the example, not all frequencies within a given sub-frequency group may be assigned.

The operation of the automatic frequency assignment process (step 150) may be better understood by reference again to the specific example illustrated in FIG. 5. In step 152, the frequencies f of the sub-frequency groups 14(1) and 14(2) specified for use as the analog control channel ($f_{ACC}$) and digital control channel ($f_{DCC}$) are assigned to the appropriate corresponding transceivers 26. If no digital control channel frequency ($f_{DCC}$) is specified in one of the sub-frequency groups 14(1)–14(3), the frequency within a sub-frequency group 14(n) having either a "digital" or "dual" operating permission tag, and having the best (i.e., lowest) uplink interference $I_{UP}$, is selected (step 152') for use as the digital control channel. Next, the remaining frequencies within the sub-frequency groups 14(1)–14(3) are assigned 154 to the remaining transceivers 26 of the cell configuration, taking into account the operating permission tags of the sub-frequency groups from which the frequencies are taken in view of the specified type of operation for the transceivers. The order with which this operation occurs may comprise one of three ways. First, as illustrated for purposes of this example in the context of sub-frequency group 14(1), the frequencies are assigned 154' to the transceivers 26 in accordance with their top to bottom numerical ordering within the sub-frequency group. Second, as illustrated for purposes of this example in the context of sub-frequency group 14(2), the frequencies are assigned 154" to the transceivers 26 in accordance with their bottom to top numerical ordering within the sub-frequency group. Third, as illustrated for purposes of this example in the context of sub-frequency group 14(3), the frequencies are assigned 154" to the transceivers 26 in accordance with the best to worst (i.e., lowest to highest uplink interference $I_{UP}$) available frequency.

Figure 8:
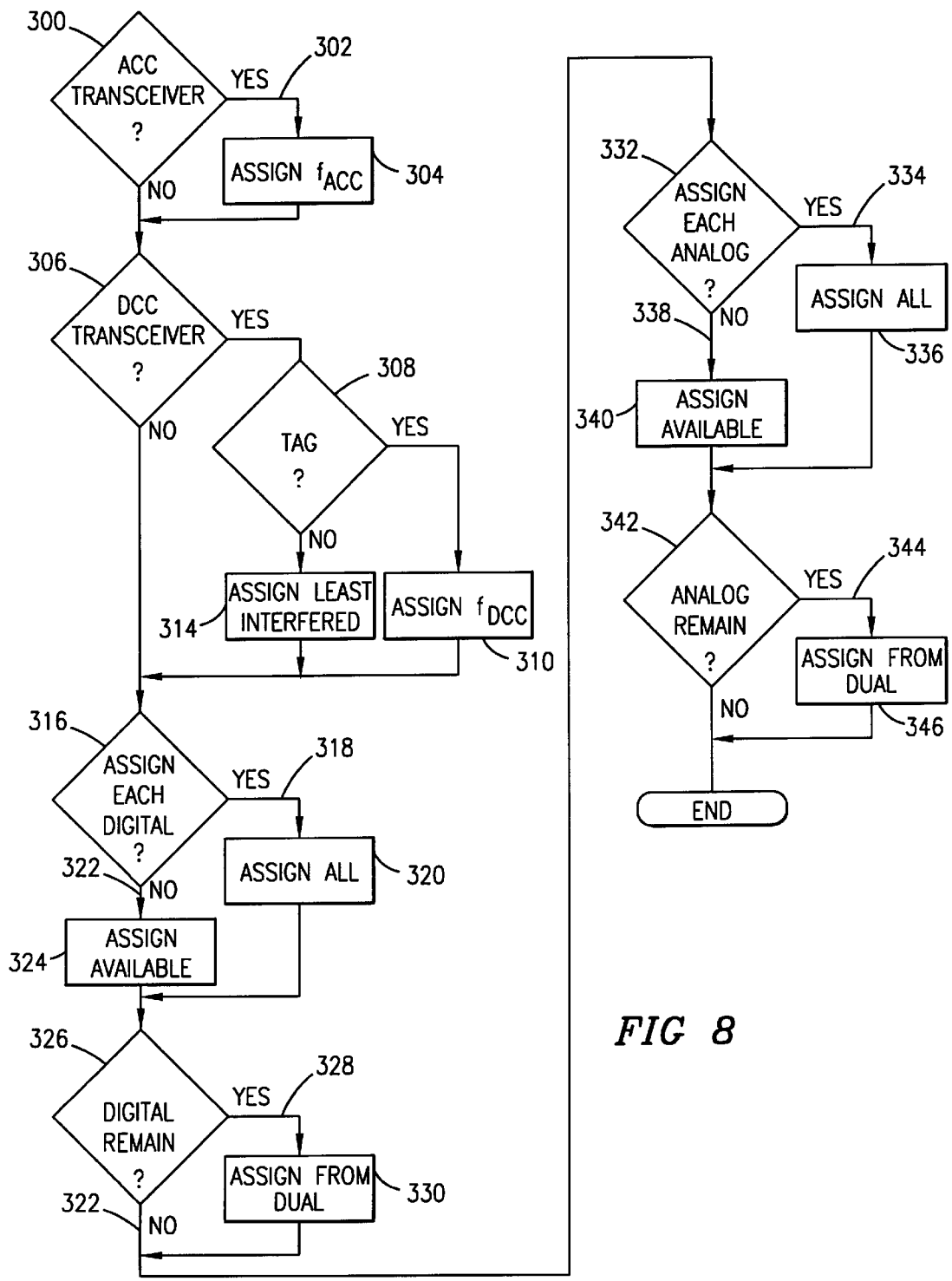
FIG. 8 is a flow diagram for an implementation of the automatic frequency assignment process.

A more detailed presentation of the automatic frequency assignment process of step 150 is shown in the flow diagram of FIG. 8. First, a determination is made in step 300 as to whether the cell contains a transceiver designated for analog control channel use. If yes (path 302), the frequency having a tag specifying its channel as an analog control channel ($f_{ACC}$) is assigned to that transceiver in step 304. Next, a determination is made in step 306 as to whether the cell contains a transceiver designated for digital control channel use. If yes, a determination is made in step 308 as to whether a frequency in the proposal has a tag specifying its channel for use as a digital control channel ($f_{DCC}$). If yes, that frequency is assigned to the digital control channel transceiver in step 310. If no, the best frequency from the least interfered of the sub-frequency groups having either a digital or dual operating permission tag is assigned to that transceiver in step 314. Next, the assignment step 154 of FIG. 7 is performed as follows. First, for each sub-frequency group having a digital operating permission tag, a determination is made in step 316 as to whether each transceiver designated for digital operation can receive a frequency from a sub-frequency group with a digital operating permission. If yes (path 318), these frequencies are assigned in accordance with the user specified order parameter (top to bottom, bottom to top, or best to worst) to the digital transceivers in step 320. If no (path 322), the frequencies of the sub-frequency group are assigned in accordance with the specified order to the available digital transceivers in step 324. Next, a determination is made in step 326 as to whether any digital transceivers remain which have not yet been assigned a frequency. If yes (path 328), frequencies are assigned to these transceivers from sub-frequency group(s) having a dual operating permission tag in step 330. If digital operation for the cell is preferred, this assignment is made from the least interfered of the dual mode sub-frequency groups. Otherwise, if analog operation is preferred, this assignment is made from the most interfered of the dual mode sub-frequency groups. Next, for each sub-frequency group having an analog operating permission tag, a determination is made in step 332 as to whether each transceiver designated for analog operation can receive a frequency from a sub-frequency group having an analog operating permission. If yes (path 334), these frequencies are assigned in accordance with the user specified order parameter (top to bottom, bottom to top, or best to worst) to the analog transceivers in step 336. If no (path 338), the frequencies of the sub-frequency group are assigned in accordance with the specified order to the available analog transceivers in step 340. Next, a determination is made in step 342 as to whether any analog transceivers remain which have not yet been assigned a frequency. If yes (path 344), frequencies are assigned to these transceivers from sub-frequency group(s) having a dual operating permission tag in step 346. If analog operation for the cell is preferred, this assignment is made from the least interfered of the dual mode sub-frequency groups. Otherwise, if digital operation is preferred, this assignment is made from the most interfered of the dual mode sub-frequency groups.

The proposals are further submitted for a network validation check in step 160 to determine whether any adverse consequences to the network might arise from an actual (i.e., physical as opposed to hypothetical) implementation of the proposal. The primary purposes of this procedure are to prevent two cells, within a certain operator definable distance, from substantially simultaneously implementing proposals which would involve: a) a switch to the same sub-frequency group; b) a switch from the same sub-frequency group; c) a switch to adjacent sub-frequency groups; and d) a switch from adjacent sub-frequency groups. The additional purposes of this procedure are to prevent two cells, within a certain operator definable distance, from substantially simultaneously implementing proposals where: e) one cell is switching from and the other cell is switching to the same sub-frequency group; f) one cell is switching to and the other cell is switching from the same sub-frequency group; g) one cell is switching from and the other cell is switching to adjacent sub-frequency groups; and, h) one cell is switching to and the other cell is switching from adjacent sub-frequency groups.

Figure 9:
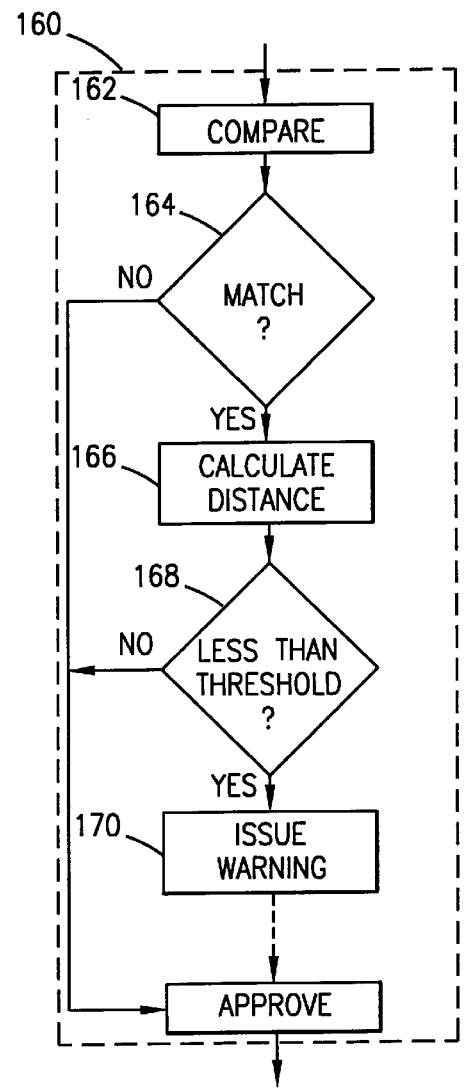
FIG. 9 is a flow diagram for a network validation check process within the procedure of FIG. 2.

The network validation check of step 160 is illustrated in FIG. 9. A proposal being made with respect to a certain cell is compared in step 162 against a record previously implemented proposals. The record stores these implemented proposals back only for a certain defined time period. A test is then made in step 164 as to whether there are any entries in the record which have either: a "from" sub-frequency group identifier that is the same as or is adjacent to a "from" sub-frequency group identifier in the current proposal; a "to" sub-frequency group identifier that is the same as or is adjacent to a "to" sub-frequency group identifier in the current proposal; a "from" sub-frequency group identifier that is the same as or is adjacent to the "to" sub-frequency group identifier in the current proposal; or, a "to" sub-frequency group identifier that is the same as or is adjacent to the "from" sub-frequency group identifier in the current proposal. The foregoing description assumes that all of the cells in the service area are allocated frequency in accordance with the same process for identifying sub-frequency groups. In instances where similarly identified sub-frequency groups do not necessarily include the same frequencies, the test of step 164 determines whether there are any entries in the record which have either: a frequency in the identified "from" sub-frequency group that is the same as or is adjacent to a frequency in the identified "from" sub-frequency group in the current proposal; a frequency in the identified "to" sub-frequency group that is the same as or is adjacent to a frequency in the identified "to" sub-frequency group in the current proposal; a frequency in the identified "from" sub-frequency group that is the same as or is adjacent to a frequency in the identified "to" sub-frequency group in the current proposal; or, a frequency in the identified "to" sub-frequency frequency group that is the same as or is adjacent to a frequency in the identified "from" sub-frequency group in the current proposal.

If the answer to the determination in step 164 is affirmative, then a calculation is made in step 166 of the distance between the cell of the current proposal and the cell of the matching proposal in the record. The calculated distance is then compared in step 168 to a threshold distance. It should be noted here that in the instance of a layered cell structure, the threshold distance may be different for umbrella (macro) cells, micro cells and pico cells, or any combination thereof. Furthermore, different threshold distances may be specified for the same and adjacent sub-frequency group analyses. If the calculated distance is less than the threshold, the cells are too close to each other and a warning is issued in step 170 that the proposal at issue may have adverse consequences to the network if implemented. It should be noted, however, that the warning may still be ignored, and the proposal approved for either pre-update verification or a system retune (see, FIG. 2). Alternatively, operation may be implemented to automatically reject the proposal if the distance is too close. If there is no match in step 164 or the distance is greater than the threshold in step 168, then the proposal is approved by the network validation check. The proposal is then accepted and becomes a part of a record.

Figure 10:
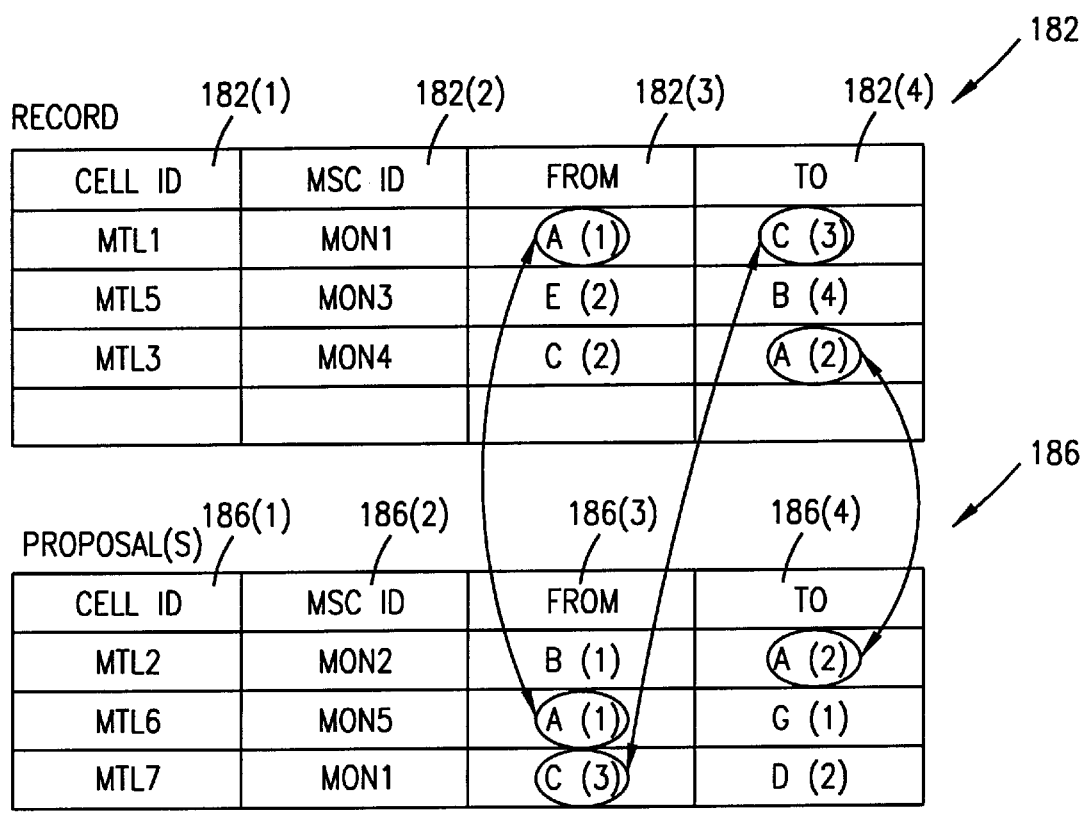
FIG. 10 is an illustration of an exemplary implementation of the network validation check process.

The operation of the network validation check process (step 160) may be better understood by reference to a specific example illustrated in FIG. 10. At the top of FIG. 10 is shown the record 182 of previously approved proposals. The record 182 indicates for each approved proposal, the identification 182(1) of the cell 10 which made the request, the identification 182(2) of the mobile switching center 22 to which that cell is assigned, the identification 182(3) of the sub-frequency group 14(n) from which a change was requested (i.e., the selected sub-frequency group that was dropped), and the identification 182(4) of the sub-frequency group 14(n) to which a change was requested (i.e., the candidate sub-frequency group that was added). The record may include other information of interest (not shown) such as an identification of the proposal that resulted in the recorded change, the current status (i.e., planned, deployed, or the like) of the proposal, and the date of implementation.

In the present example, only three previously approved proposals are included in the record 182. The first previously approved proposal was made on behalf of cell 10 MTL1 belonging to mobile switching center 22 MON1 with respect to a change from sub-frequency group 14(n) A(1) to C(3). The second previously approved proposal was made on behalf of cell 10 MTL5 belonging to mobile switching center 22 MON3 with respect to a change from sub-frequency group 14(n) E(2) to B(4). The third previously approved proposal was made on behalf of cell 10 MTL3 belonging to mobile switching center 22 MON4 with respect to a change from sub-frequency group 14(n) C(2) to A(2).

At the bottom of FIG. 10 are shown the proposals which are now being submitted for the network validation check of step 160. Like the record 182, the proposals include an identification 186(1) of the cell 10 for which the proposal is being submitted, an identification 186(2) of the mobile switching center 22 to which that cell is assigned, an identification 186(3) of the selected sub-frequency group 14(n) that the proposal requests be dropped, and an identification 186(4) of the candidate sub-frequency group 14(n) that the proposal requests be added.

In the present example, three proposals are currently under scrutiny with respect to the network validation check 160. The first proposal is being made on behalf of cell 10 MTL2 belonging to mobile switching center 22 MON2 with respect to a change from sub-frequency group 14(n) B(1) to A(2). The second proposal is being made on behalf of cell 10 MTL6 belonging to mobile switching center 22 MON5 with respect to a change from sub-frequency group 14(n) A(1) to G(1). The third proposal is being made on behalf of cell 10 MTL7 belonging to mobile switching center 22 MON 1 with respect to a change from sub-frequency group 14(n) C(3) to D(2).

The proposals are taken up for consideration by the network validation check 160 on a first come, first served, basis. Other implementations for considering the proposal may alternatively be used. The comparison of step 162 first involves testing in step 164 whether there are any entries in the record 182 which have either: a "from" sub-frequency group identifier 182(3) that is the same as or is adjacent to a "from" sub-frequency group identifier 186(3) in the proposal at issue; a "to" sub-frequency group identifier 182(4) that is the same as or is adjacent to a "to" sub-frequency group identifier 182(4) in the proposal at issue; a "from" sub-frequency group identifier that is the same as or is adjacent to the "to" sub-frequency group identifier in the proposal at issue; or, a "to" sub-frequency group identifier that is the same as or is adjacent to the "from" sub-frequency group identifier in the proposal at issue. With respect to the first proposal at issue, a match is found because its "to" sub-frequency group identifier 186(4) is the same as the "to" sub-frequency group identifier 182(4) of the third previously approved proposal stored in the record 182.

Again, it is recognized that this process example assumes that all of the cells in the service area are allocated frequencies in accordance with the same process for identifying sub-frequency groups. If this were not the case, the test of step 164 would instead determine whether there are any entries in the record which have either: a frequency in the identified "from" sub-frequency group that is the same as or is adjacent to a frequency in the identified "from" sub-frequency group in the current proposal; a frequency in the identified "to" sub-frequency group that is the same as or is adjacent to a frequency in the identified "to" sub-frequency group in the current proposal; a frequency in the identified "from" sub-frequency group that is the same as or is adjacent to a frequency in the identified "to" sub-frequency group in the current proposal; or, a frequency in the identified "to" sub-frequency group that is the same as or is adjacent to a frequency in the identified "from" sub-frequency group in the current proposal.

Having satisfied the test of step 164, a calculation is then made in step 166 of the distance d between cell 10 MTL2 (belonging to mobile switching center 22 MON2) and cell MTL3 (belonging to mobile switching center 22 MON4). If the distance d is less than a certain threshold (which may take into account layered cell structures) as determined in step 168, a warning is issued in step 170 that the proposal at issue may have adverse consequences to the network if implemented.

With respect to the second proposal at issue, a match is also found because its "from" sub-frequency group identifier 186(3) is the same as the "from" sub-frequency group identifier 182(3) of the first previously approved proposal stored in the record 182. A similar step 166 distance calculation and step 168 threshold comparison process is then performed with respect to cell 10 MTL6 (belonging to mobile switching center 22 MON5) and cell 10 MTL1 (belonging to mobile switching center 22 MON1). If the distance is less than the threshold, the warning will be issued. In accordance with the first come, first served processing, it will, of course, be understood, that if the first proposal were thereafter approved, it would be added to the record 182, and the process would have to take the first proposal into consideration when evaluating the second proposal.

With respect to the third proposal at issue, a match is also found because its "from" sub-frequency group identifier 186(3) is the same as the "to" sub-frequency group identifier 182(3) of the first previously approved proposal stored in the record 182. A similar step 166 distance calculation and step 168 threshold comparison process is then performed with respect to cell 10 MTL7 (belonging to mobile switching center 22 MON5) and cell 10 MTL1 (belonging to mobile switching center 22 MON1). If the distance is less than the threshold, the warning will be issued. In accordance with the first come, first served processing, it will, of course, be understood, that if the first or second proposal were thereafter approved, it would be added to the record 182, and the process would have to take the first and/or proposal into consideration when evaluating the third proposal.

It is recognized again that the proposal may, following completion of the frequency group mode validation functionality, automatic frequency assignment functionality and network validation functionality checks, be validated against certain rules (e.g., mobile network configuration rules relating to channel separation, potential intermodulation products, and data required for hand-off).

With reference once again to FIG. 2, attention is next directed to the process for measuring downlink interference of step 114. It is noted that the radio statistics measurements made in step 106 and analyzed in step 108 for the purpose of proposal definition fail to take into consideration the existence of interference on the downlink. Such interference should preferably be considered before making any changes in the frequency plan. Accordingly, the system requests mobile stations 20 to make downlink interference measurements (in step 114) on each of the individual frequencies within the candidate sub-frequency groups for each of the stored proposals. The downlink interference measurements on these individual frequencies are preferably made by the mobile stations 20 in the normal course of operation where mobile assisted handoff (MAHO) measurements are made and reported. These measurements are advantageously utilized in connection with both the pre-update verification calculations of step 116 and the post-update verification calculations of step 122.

Turning next to the pre-update verification calculations of step 116, the following are also calculated:

(a) $I_{up\_old\_w\_pre}$: the uplink interference value for each cell for which pre-update verification was requested, calculated using only the old sub-frequency groups to be changed with the average weighted by the number of frequencies in each sub-frequency group;

(b) $I_{up\_new\_w\_pre}$: the uplink interference value for each cell for which pre-update verification was requested, calculated using only the proposed new sub-frequency groups with the average weighted by the number of frequencies in each sub-frequency group; and (c) $I_{dn\_new\_w\_pre}$: the downlink interference value for each cell for which pre-update verification was requested, calculated using only the proposed new sub-frequency groups with the average weighted by the number of frequencies in each sub-frequency group.

Reference is once again made to FIG. 3. Utilizing the graphical user interface 50 of the frequency planning tool 40, an operator may view the (a)–(c) results of the FIG. 2, step 116 evaluation process on a pre-update verification confirmation list. For example, concerning an operator selected proposal identified on the pre-update verification confirmation list for which pre-update verification was requested, information may be obtained through user interface 50 interaction concerning, for example, cell name, $I_{up\_old\_w\_pre}$, $I_{up\_new\_w\_pre}$, $I_{dn\_new\_w\_pre}$, status of proposal, and whether post update verification has been requested. Through further operator interaction with the graphical user interface 50, a cell in the pre-update verification confirmation list may be selected, and the operator given the option, on a per cell basis, to:

confirm proposed changes to the cell (note that only one confirmation per cell is allowed);

delete a proposal from the list;

expand a selected cell to provide the operator with further pertinent information comprising, for example, $I_{up\_sel\_pre}$ for each selected sub-frequency group in the proposal, and $I_{up\_cand\_pre}$ and $I_{dn\_cand\_pre}$ for each candidate sub-frequency group in the proposal;

perform a manual frequency assignment;

validate the confirmed proposals from the pre-update verification confirmation list against certain validation rules (e.g., mobile network configuration check rules concerning channel separation, potential for intermodulation products, and data required for hand-off); and request a network update to be performed in accordance with a confirmed proposal.

Reference is once again made to FIG. 2. Following operator request to have a network update performed with respect to a confirmed proposal (either after the evaluation calculation of step 108 or the pre-update verification calculation of step 116), the network is returned through the implementation of a network update in step 112. The operator has the option through further interaction with the graphical user interface 50 (see, FIG. 3) to schedule, on a per confirmed proposal basis, the time and date at which the update is to be performed. In connection with the performance of the update in step 112, updates, when required, in cooperating mobile switching centers are also effectuated. For example, if a frequency change is ordered in a border cell, the cooperating mobile switching center is provided with new channel number information, border cell selection data, digital locating data and bordering cell data. Furthermore, certain channel equipment for cells implicated in the retune is manually blocked before a frequency change is ordered. For frequency agile devices, the original state of the device is returned following the frequency change. For non-frequency agile devices, the devices remain blocked after the change, and the operator is provided with an appropriate notice. As a further alternative, it is possible to have the update printed out in hard copy format for manual implementation.

Turning next to the post-update verification calculations of step 122, the following are also calculated for each cell for which post-update verification was requested:

(a) $I_{up\_old\_w\_eval}$: the uplink interference value calculated using only the old selected sub-frequency groups with the average weighted by the number of frequencies in each sub-frequency group;

(b) $I_{up\_new\_w\_eval}$: the uplink interference value calculated using only the new selected sub-frequency groups with the average weighted by the number of frequencies in each sub-frequency group;

(c) $BER_{up\_w\_eval}$: the average uplink bit error rate for the old selected sub-frequency groups with the average weighted by the number of frequencies in each sub-frequency group;

(d) $BER_{dn\_w\_eval}$: the average downlink bit error rate for the old selected sub-frequency groups with the average weighted by the number of frequencies in each sub-frequency group;

(e) $I_{up\_new\_w\_post}$: the uplink interference value calculated using only the new selected sub-frequency groups with the average weighted by the number of frequencies in each sub-frequency group;

(f) $I_{up\_old\_w\_post}$: the uplink interference value calculated using only the old selected sub-frequency groups with the average weighted by the number of frequencies in each sub-frequency group;

(g) $I_{dn\_cand\_post}$: the average downlink interference value for the old selected sub-frequency group calculated from the average of the extra MAHO measurement for all included frequencies;

(h) $I_{dn\_old\_w\_post}$: the downlink interference value calculated using only the average downlink interference values for old selected sub-frequency groups with the average weighted by the number of frequencies in each sub-frequency group;

(i) $BER_{up\_w\_post}$: the average uplink bit error rate for the new selected sub-frequency groups using post-update data with the average weighted by the number of frequencies in each sub-frequency group; and (j) $BER_{dn\_w\_post}$: the average downlink bit error rate for the new selected sub-frequency groups using post update data with the average weighted by the number of frequencies in each sub-frequency group.

In addition, for each cell where a post-update verification was requested, the following calculations are made for each co-channel cell before the frequency change:

(k) $I_{up\_sel\_w\_cobef}$: the uplink interference value calculated using radio environment statistics measurements in the co-channel cell before the network update; and (l) $I_{up\_sel\_w\_coaft}$: the uplink interference value calculated using radio environment statistics measurements in the co-channel cell after the network update.

Furthermore, for each cell where a post-update verification was requested, the following calculations are made for each co-channel cell after the frequency change:

(m) $I_{up\_sel\_w\_cobef}$: the uplink interference value calculated using radio environment statistics measurements in the co-channel cell before the network update; and (n) $I_{up\_sel\_w\_coaft}$: the uplink interference value calculated using radio environment statistics measurements in the co-channel cell after the network update.

In addition, for each cell where a post-update verification was requested, the following calculations are made for each adjacent-channel cell before the frequency change:

(o) $I_{up\_sel\_w\_adjbef}$: the uplink interference value calculated using radio environment statistics measurements in the adjacent-channel cell before the network update; and (p) $I_{up\_sel\_w\_adjaft}$: the uplink interference value calculated using radio environment statistics measurements in the adjacent-channel cell after the network update.

Furthermore, for each cell where a post-update verification was requested, the following calculations are made for each adjacent-channel cell after the frequency change:

(q) $I_{up\_sel\_w\_adjbef}$: the uplink interference value calculated using radio environment statistics measurements in the adjacent-channel cell before the network update; and (r) $I_{up\_sel\_w\_adjaft}$: the uplink interference value calculated using radio environment statistics measurements in the adjacent-channel cell after the network update.

Reference is once again made to FIG. 3. Utilizing the graphical user interface 50 of the frequency planning tool 40, an operator may view the (a)–(r) results of the FIG. 2, step 122 evaluation process. A changed cell list may be presented on the graphical user interface for operator consideration. This changed cell list identifies the following information:

cell name;

number of assigned frequencies;

improvement ($I_{up\_old\_w\_post} - I_{up\_new\_w\_post}$);

expected improvement ($I_{up\_old\_w\_eval} - I_{up\_new\_w\_eval}$);

uplink/downlink bit error rate comparison for both pre and post update; and uplink/downlink interference comparison for both pre and post update.

An individual cell in the changed cells list may be selected by the operator through the graphical user interface 50 to generate a list of co-channel cells prior to network update and a list of co-channel cells after network update, wherein the co-channel cells are within a predetermined distance of the selected cell. The co-channel before list identifies cell name, uplink interference level before change, uplink interference level after change, and an interference enhancement resulting from the change. The co-channel after list similarly identifies cell name, uplink interference level before change, uplink interference level after change, and an interference enhancement resulting from the change. This list may be specified to include only those cells within an operator definable distance of a certain cell. An individual cell in the changed cells list may selected by the operator through the graphical user interface 50 to generate a list of adjacent-channel cells prior to network update and a list of adjacent-channel cells after network update, wherein the adjacent-channel cells are within a predetermined distance of the selected cell. The adjacent-channel before list identifies cell name, uplink interference level before change, uplink interference level after change, and an interference enhancement resulting from the change. The adjacent-channel after list similarly identifies cell name, uplink interference level before change, uplink interference level after change, and an interference enhancement resulting from the change. This list may be specified to include only those cells within an operator definable distance of a certain cell.

Through further operator interaction with the graphical user interface 50, a cell in the changed cells list may be selected, and the operator given the option, on a per cell basis, to:

confirm the deployed changes to the cell;

roll-back the cell to its original state using either a partial roll-back (wherein only a selected cell is rolled back), or a full roll-back (wherein all of the cells changed in the current activity are rolled back);

generate a pair of lists for the cell, a first list containing interference and bit error rate information for the old sub-frequency group assigned to that cell, and a second list containing interference and bit error rate information for the new sub-frequency group assigned to that cell;

validate the proposed changed cells list in the event of a roll-back against certain validation rules (e.g., mobile network configuration check rules) as well as perform a network validation check; and apply the actions taken in post-update verification to either deploy the roll-back or complete the update.

Reference is once again made to FIG. 3. As discussed above, the graphical user interface 50 of the frequency planning tool 40 provides a user friendly interface in a frequency reallocation editor (FRE) 60 feature for supporting operator analysis of the data generated by the evaluation calculation of step 108, the pre-update verification calculation of step 116 and the post-update verification calculation of step 122 (see, FIG. 2). The graphical user interface 50 further supports operator definition of proposals, and the selection of proposals for pre-update verification, update, post-update verification, and roll-back. Three additional features, however, are also provided to the operator through the graphical user interface 50.

A first additional feature is a frequency set display (FSD) 70 feature. Using the frequency set display feature, the operator may manage the frequency plan for the network (taking into account the various hyperbands implicated by the network). As an example, default support for 7/21 and 4/12 frequency plans is provided for 800 MHz hyperband networks, while default support for 7/21 and 9/27 frequency plans is provided for 1900 MHz hyperband networks. Of course, through the user friendly interface of the frequency set display feature, other frequency plans may be defined. The frequency set display feature supports user creation of a frequency set through the graphical user interface 50 by allowing for the selection of a hyperband, the selection of one or more specific frequency band(s) from amongst those available to the selected hyperband, and the specification of the number of sectors and the number of frequency groups per sector. Using the graphical user interface 50, the operator may define the frequency content of the sub-frequency groups (by, for example, assigning frequencies to sub-frequency groups, dividing and joining sub-frequency groups, and assigning analog, digital or dual mode permission to sub-frequency groups). The operator may further tag a frequency from one of the sub-frequency groups with a permission to be used only with an analog control channel (provided the sub-frequency group has analog mode permission). The graphical user interface 50 further supports operator tagging of a frequency from one of the sub-frequency groups with a permission to be used only with a digital control channel (provided the sub-frequency group has digital mode permission).

A second additional feature is a graphical cell display (GCD) 80 feature. Using the graphical cell display feature, the operator may graphically view frequency reallocation activity in the network. For example, in one graphical presentation format, a certain cell or collection of cells of interest to the operator are displayed overlaid on top of a geographical map of the service area covered by the network (showing, for example, roads, bodies of water, demographic data, and the like). Visual discrimination techniques (such as, for example, shape, color or shading changes) are utilized to present the status, value and item related information concerning network operation in a more user friendly manner. As an example, different types of cells (macro, micro, and pico) as graphically presented using different geometric shapes. Performance related data (presented in hard number format through the frequency reallocation editor feature described above) is graphically presented, for example, by differentiating on the basis of measured interference by color changes.

A number of display options are available. A first option, referred to as a global option, displays the results of interest to the operator for all cells in one or more mobile switching centers implicated in a frequency reallocation activity. Using this option, the operator may view through the graphical cell display 80 feature of the graphical user interface the following:

- the overall and worst uplink interference levels for all selected sub-frequency groups, with each range of interference resulting in a different colored cell;
- the overall and worst uplink bit error rate for all selected sub-frequency groups, with each range of error rate resulting in a different colored cell;
- the overall and worst downlink bit error rate for all selected sub-frequency groups, with each range of error rate resulting in a different colored cell;
- all co-channel cells for a given selected cell (with filtering available for supervisory audio tone, digital color code and digital voice channel color code); and
- all cells utilizing a selected sub-frequency group (with filtering available for supervisory audio tone, digital color code and digital voice channel color code).

A second option, referred to as the impact option, displays the results of interest to the operator for all cells implicated in a selected frequency reallocation activity. Using this option, the operator may view through the graphical cell display 80 feature of the graphical user interface 50 the following:

- expected interference improvement at evaluation with each range of improvement resulting in a different colored cell;
- expected interference improvement at pre-update verification with each range of improvement resulting in a different colored cell;
- actual interference improvement with each range of improvement resulting in a different colored cell;
- comparisons of uplink versus downlink interference with each range of interference difference resulting in a different colored cell;
- all co-channel cells in the proposal for a given selected cell (with filtering available for supervisory audio tone, digital color code and digital voice channel color code);
- co-channel interference improvement for cells that were co-channel cells before the update with each range of improvement resulting in a different colored cell; and
- co-channel interference deterioration for cells that became co-channel cells after the update with each range of deterioration resulting in a different colored cell.

A third feature of the frequency planning tool 40 is a report generation feature 90. These reports graphically present frequency reallocation data allowing the operator to observe the impact that retunes have on the network. In general, the following reports are made available: an interference report for selected and/or candidate sub-frequency groups on a cell basis; a spectrum report for all frequencies on a cell basis; an interference cumulative distribution function report for selected frequencies; and an interference trend report for selected frequencies in a mobile switching center. More specifically, the reports generated using the feature 90 including:

- a bar chart report showing the uplink interference level for all measured frequencies (candidate and selected) in a cell on a sub-frequency group basis. For the selected sub-frequency group, the measurements from the voice channels shall be used. On the same report, the average cell uplink interference level (for the selected frequencies) shall also be plotted. The report may be limited to a certain measurement period and/or to a certain selected cell;
- a line chart report showing the uplink interference level of each measured selected and/or candidate frequency in a cell. On the same report, the average cell uplink interference level (for the selected frequencies) is also shown. The standard deviation, as well as the mean, maximum and minimum values of the selected frequencies are provided. The report may be limited to a certain measurement period and/or to a certain selected cell;
- a bar chart report showing the uplink interference level of each selected frequency in a cell. On the same report, the average cell uplink interference level (for the selected frequencies) is also shown. The standard deviation, as well as the mean, maximum and minimum values of the selected frequencies are provided. The report may be limited to a certain measurement period and/or to a certain selected cell;
- a line chart report showing the cumulative distribution function of $I_{up\_sel\_w}$ for all cell measurements for cells of a given cell coverage in a mobile switching center. The function is calculated from the average uplink interference measurements of selected frequencies, and is generated using measurement data for any combination of cells that have the given cell coverage. The report may be limited to a certain measurement period; and
- a trend report showing the trend of the average uplink interference for all selected frequencies on a user definable number of cells or on a mobile switching center basis and for a user definable measurement period. Note here that an operator may also generate custom reports from the collected measurement data.

Closed Loop Processing

Figure 11:
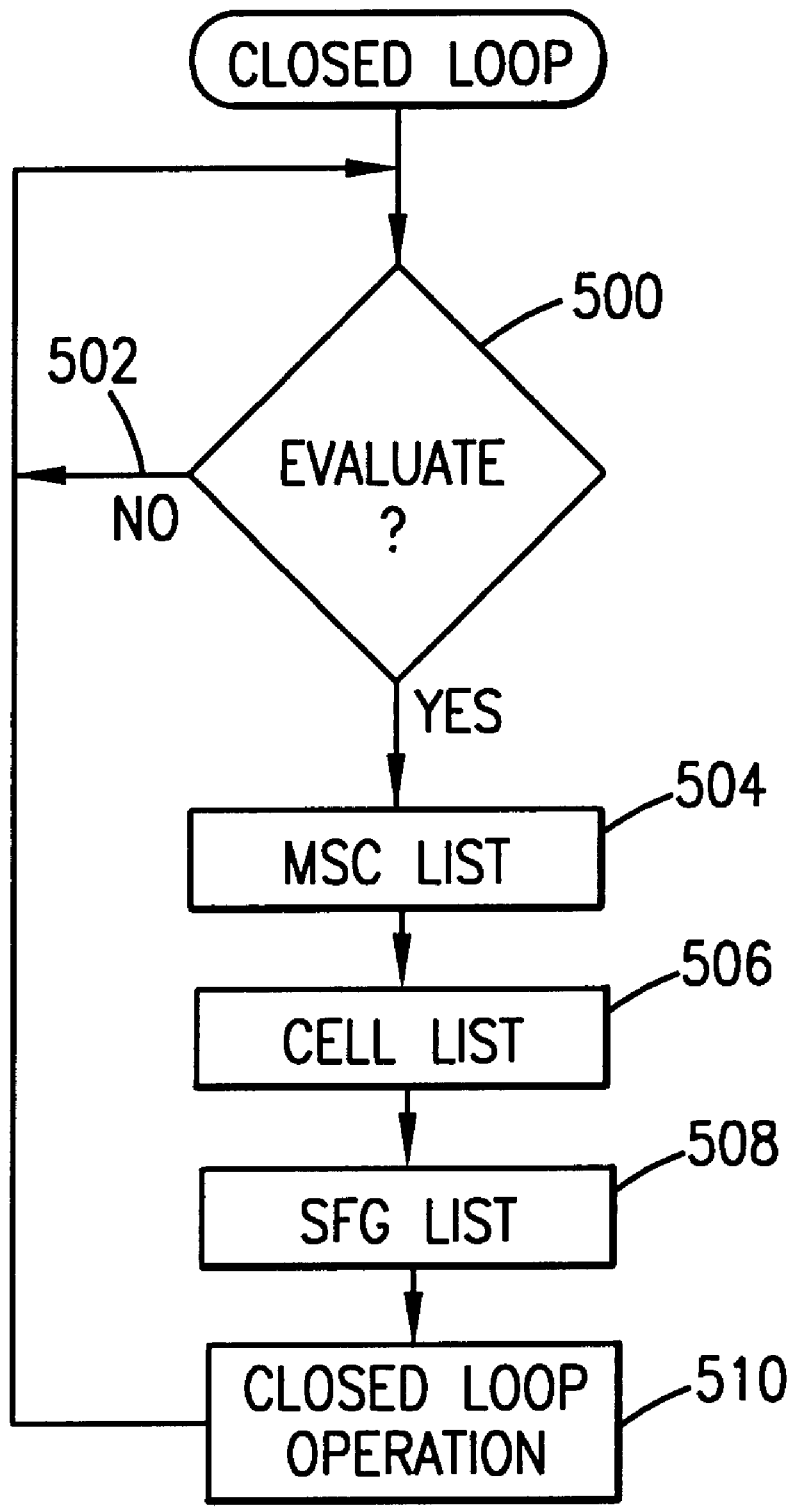
FIG. 11 is a general flow diagram for a "closed loop" procedure of the present invention to effectuate a revision in a frequency plan for a cellular telephone system.

Reference is now made to FIG. 11 wherein there is shown a general flow diagram for a "closed loop" procedure of the present invention to effectuate a revision in a frequency plan for a cellular telephone system. By "closed loop" it is meant that the procedure operates in an autonomous and automatic fashion without need for the participation and supervision of a network service operator or service provider in the manner described above with respect to the operator assisted open loop procedure. In step 500, the procedure tests whether it is time to evaluate the current frequency plan for revision. The time period tested by step 500 may be set for periodic activation. Alternatively, the time period may expire based on the occurrence of a certain event. Preferably, evaluation is initiated following the collection of measurement data for one or several previous recording program(s). If it is not time to wake up, the procedure returns (loop 502) to test again in step 500. If, on the other hand, it is time to evaluate, the procedure forms a list in step 504 of mobile switching centers in the network whose cells are to be considered for frequency plan revision. A mobile switching center is to be considered if at least one valid recording program has been received and stored, or if all scheduled recording programs have been received and stored, out of a pre-defined number of recording programs. A "recording program" in this context refers to a set of radio environment statistics and downlink interference measurements. The procedure then forms a list in step 506 of the cells to be considered for frequency plan revision in each mobile switching center. The cells under consideration include all cells associated with the step 504 identified mobile switching centers which are currently active (that is, identified by the operator to be controlled in closed loop). The procedure then forms a list in step 508 of the sub-frequency groups to be considered for frequency plan revision. The sub-frequency groups under consideration include all active sub-frequency groups for the currently active cells identified in step 506. The procedure next performs the closed loop evaluation process (to be defined in more detail below) in step 510. Following completion of the closed loop evaluation process (which may or may not result in a network update), the procedure returns to step 500.

Figure 12:
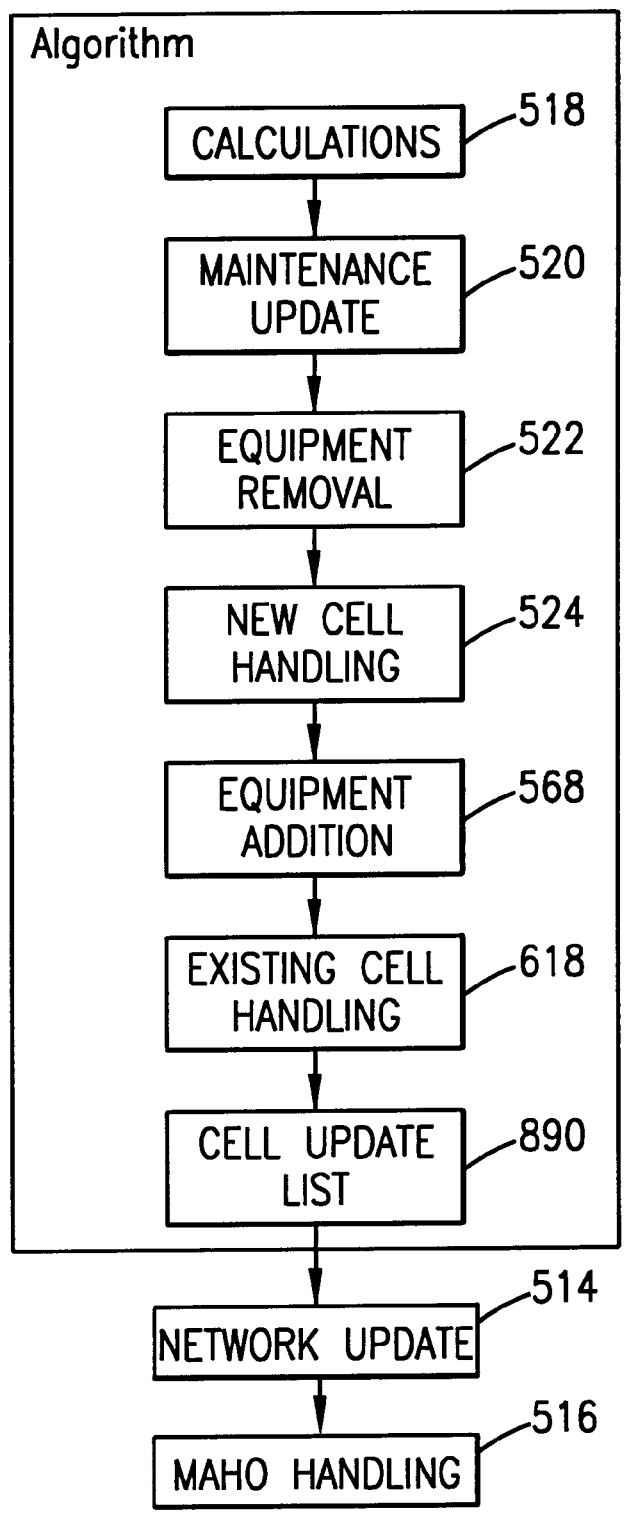
FIG. 12 is a flow diagram for the closed loop evaluation process of FIG. 11.

Reference is now made to FIG. 12 wherein there is shown a flow diagram for the closed loop evaluation process of FIG. 11, step 510. The closed loop evaluation process comprises the actions of first executing a closed loop algorithm in step 512 to identify a list of cells in need of and authorized for frequency re-allocation. Next, in step 514, a network update is performed to implement the closed loop algorithm specified re-allocation. Finally, in step 516, mobile assisted hand-off (MAHO) handling is performed to identify and order downlink measurements to be made on some sub-frequency groups which are candidates for a next pass of the closed loop operation (FIG. 11, step 510).

The closed loop algorithm executed in step 512 first makes a number of closed loop calculations in step 518. The first of these step 518 calculations comprises the calculation of the following:

for each selected sub-frequency group: $I_{up\_oss\_sel}$ (same as open loop $I_{up\_sel\_eval}$ calculation); $BER_{up\_oss\_sel}$ (same as open loop $BER_{up\_eval}$ calculation); and $BER_{dn\_oss\_sel}$ (same as open loop $BER_{dn\_eval}$ calculation); and for each candidate sub-frequency group: $I_{up\_oss\_cand}$ (same as open loop $I_{up\_cand\_eval}$ calculation); and $I_{dn\_oss\_cand}$ (same as open loop $I_{dn\_cand\_prel}$ calculation) which is available for only certain ones of the candidates. The second of these step 518 calculations comprises a determination of a system difference interference ($I_{syst\_diff}$) measurement. This second calculation is made from the measured average uplink interference $I_{up\_oss\_avg}$ for candidate frequencies and average downlink interference $I_{dn\_oss\_avg}$ for candidate frequencies in accordance with the following:

$$I_{syst\_diff} = I_{up\_oss\_avg} - I_{dn\_oss\_avg}.$$

The measured average downlink interference $I_{dn\_oss\_avg}$ component is calculated using downlink interference $I_{dn\_oss\_cand}$ data from all candidate frequencies as measured for downlink interference during a last closed loop evaluation. The measured average uplink interference $I_{up\_oss\_avg}$ component is calculated using uplink interference $I_{up\_oss\_cand}$ data from all candidate frequencies as measured during a last closed loop evaluation. In each case, the candidate frequencies at issue are for those active cells of a given coverage type (macro, mico or pico-cells) in the mobile switching center. The $I_{syst\_diff}$ calculation is performed on a cell-by-cell basis. The implementation of the $I_{syst\_diff}$ calculation may further utilize a filtering functionality to take into account previous values of $I_{syst\_diff}$ obtained from previous closed loop calculations.

The next action to be taken in the closed loop algorithm is to update the network validation check record (see, for comparison, the record of FIG. 10) to account for selected frequencies whose channel equipment is currently blocked for maintenance (step 520). This operation prevents other cells (within a user definable distance) from "stealing" the selected frequencies of other cells during maintenance periods. Thus, when channel equipment becomes blocked for maintenance, the updating of the network validation check record functions to reserve the associated selected frequency until such time as the maintenance operation is completed and the equipment becomes unblocked.

The closed loop algorithm next handles situations where channel equipment (such as a transceiver) has been designated to be removed from a cell (step 522). Assuming that a piece of channel equipment is not required by a cell, it may be selected for removal from the cell. The channel equipment to be removed is chosen by the user, and a determination is made as to whether there is at least one frequency in an active sub-frequency group for the same cell having a higher value of $I_{up\_oss\_sel\_freq}$. If yes, the frequency having the highest value of $I_{up\_oss\_sel\_freq}$ is removed, and the channel equipment having that removed frequency is designated for retune at the next network update to the frequency for the channel equipment to be removed (i.e., the worst uplink interference measured frequency in the cell is assigned to the channel equipment to be removed). This process ensures that the removal of a piece of channel equipment does not also result in the removal of a more suitable (i.e., less interfered) frequency. Following this channel equipment retune, the network validation check record (see, for comparison, the record of FIG. 10) is updated in step 522 to account for the removal of the selected channel equipment. This updating of the network validation check record functions to prevent the closed loop operation from trying to assign a frequency to the channel equipment selected for removal.

Figure 13:
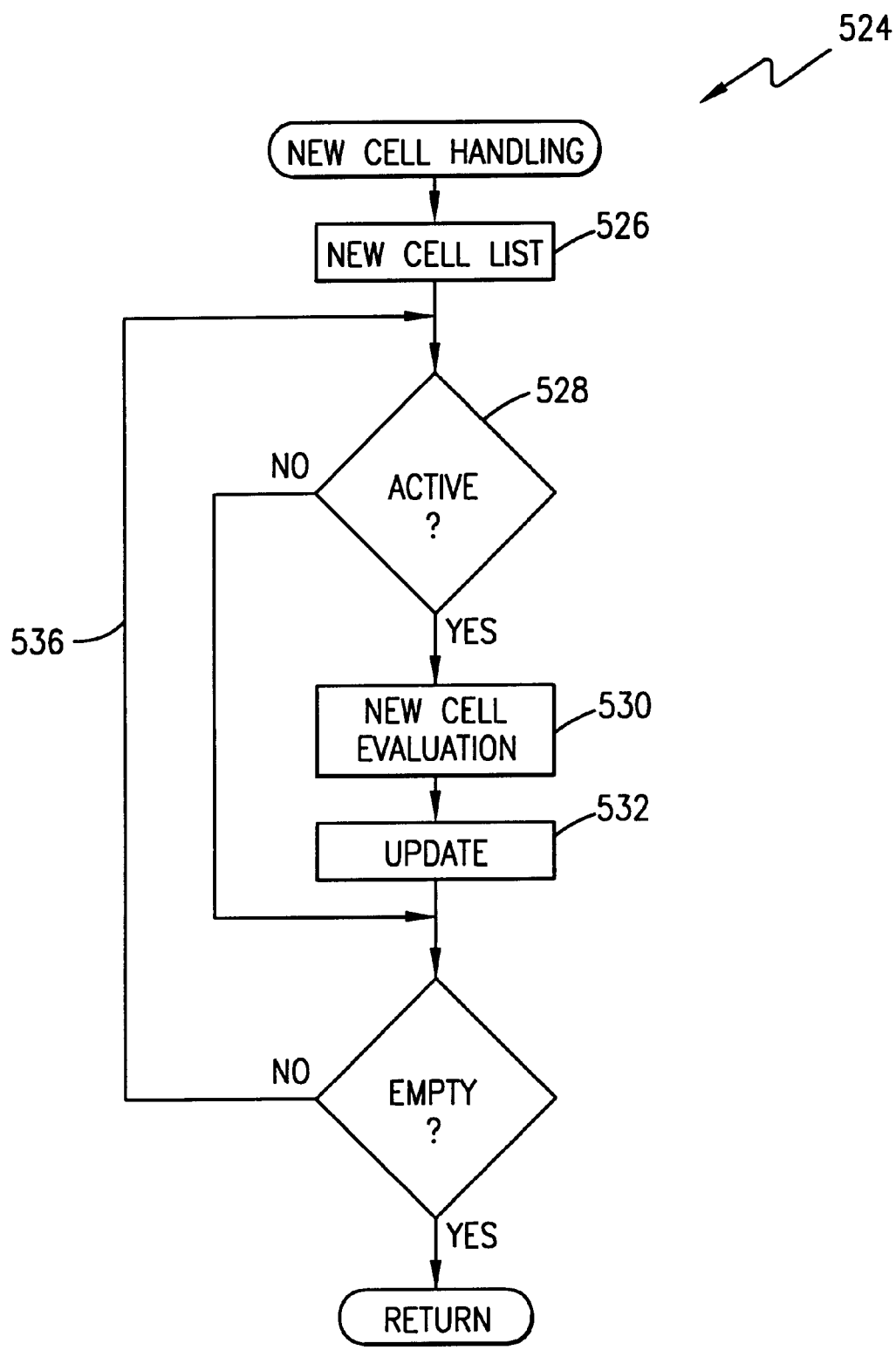
FIG. 13 is a flow diagram for the process of making frequency assignment to newly added cells.

Next, in step 524, the closed loop algorithm handles frequency assignment with respect to any cells newly added to the network. Reference is now made to FIG. 13 wherein there is shown a flow diagram illustrating the process executed in connection with step 524 for handling frequency assignments to new cells. The process first identifies a list of new cells (step 526). To support this identification, the operation support system (OSS) for the network automatically detects the presence of any new cells. Next, in step 528, a determination is made as to whether a current one of the identified new cells is active. If yes, a new cell evaluation procedure (to be described in more detail below) is executed (step 530) to determine frequency assignments for that cell. Following completion of the new cell evaluation procedure, the network validation check record (see, for comparison, the record of FIG. 10) is updated to account for the frequency assignments to that new cell (step 532). Thereafter, or if the current one of the cells is not active, a check is made in step 534 as to whether each of the step 526 identified cells has been processed. If not, the process returns (loop 536) to evaluate a next currently active cell from the list.

Figure 14:
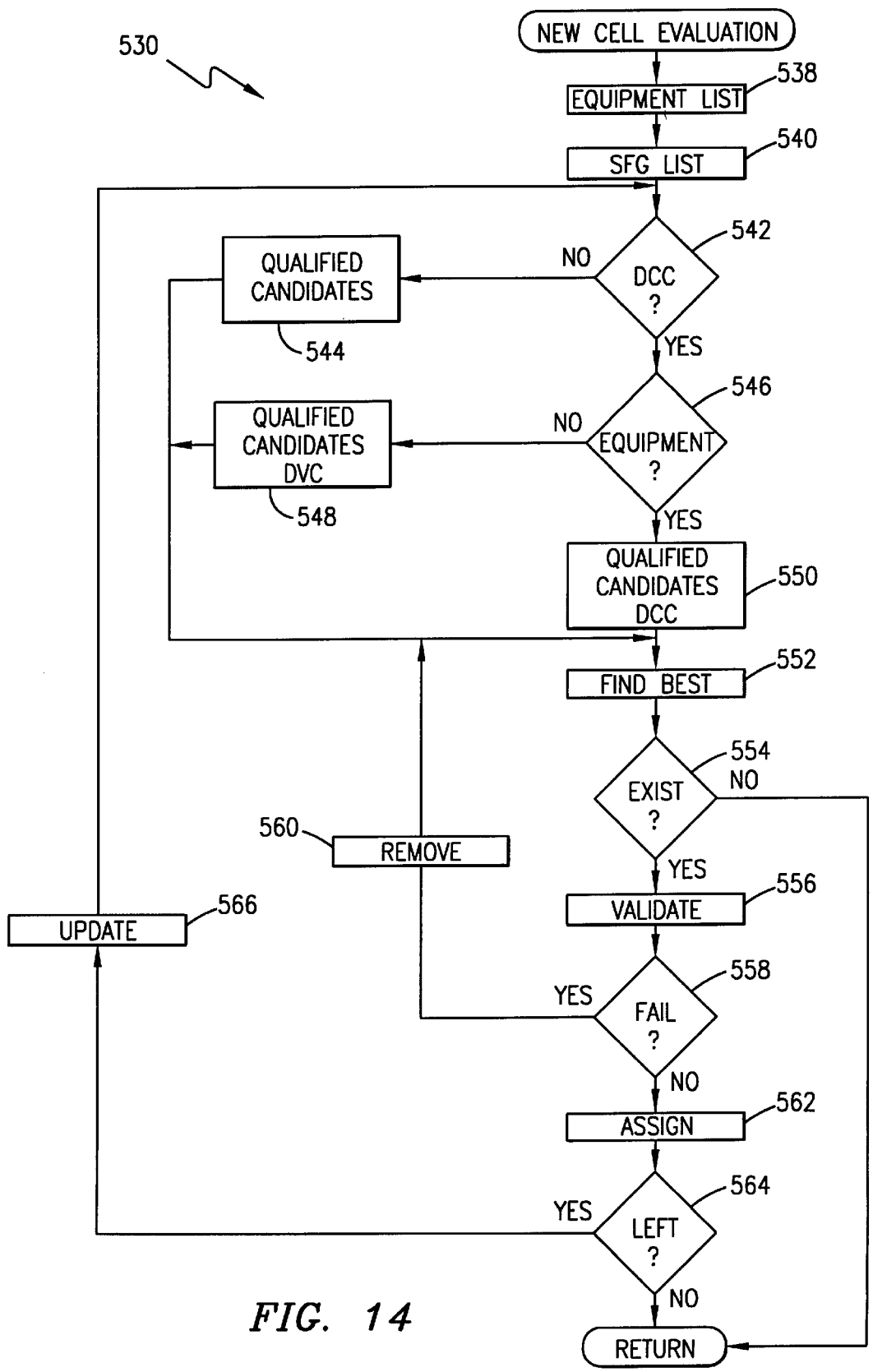
FIG. 14 is a flow diagram for the new cell evaluation procedure of FIG. 13.

Reference is now made to FIG. 14 wherein there is shown a flow diagram for the new cell evaluation procedure of FIG. 13, step 530. First, the procedure makes a list in step 538 of the (digital) channel equipment in the current new cell that needs to be returned. This list is ordered such that the channel equipment assigned to handle the digital control channel is given highest priority. The procedure then makes a list in step 540 of sub-frequency groups (non-active) selected for that new cell. A determination is then made in step 542 as to whether the frequency set for the cell contains at least one frequency tagged for use as a digital control channel.

If no in step 542, the procedure next identifies in step 544 a list of qualified candidate sub-frequency groups. In this step 544, a sub-frequency group is qualified if no downlink interference measurements were made in a last previous execution of the closed loop operation, and if the sub-frequency group meets conditions (a) and (c)–(h) as set forth below:

(a) the sub-frequency group is not assigned to the cell;

(b) the number of frequencies in the sub-frequency group exceeds or is equal to a minimum (equal to the number of assigned frequencies in the sub-frequency group to be removed), but does not exceed a maximum (equal to the maximum of either the number of frequencies in the sub-frequency group to be removed or the number of assigned frequencies in the sub-frequency group to be removed plus one);

(c) the sub-frequency group must have at least a permission for digital operation (it may have other permissions as well);

(d) none of the frequencies in the sub-frequency group may be tagged for either analog control channel or CDPD operation;

(e) the sub-frequency group may not be on the barring list (i.e., a list of frequencies that must not be assigned to a given cell) for the new cell;

(f) uplink interference measurements $I_{up\_oss\_cand}$ must be available for the sub-frequency group;

(g) sufficient channel separation with respect to either or both the frequencies of the new cell or the utilized hardware (antenna system); and (h) no potential intermodulation products may exist with respect to transmit and receive frequencies in the sub-frequency group.

If yes in step 542, the procedure next in step 546 determines whether one of the unassigned pieces of channel equipment in the new cell contains a digital control channel. If yes in step 546, the procedure next identifies in step 548 a list of qualified candidate sub-frequency groups (with respect to the sub-frequency group containing the digital control channel for the cell). In this step 548, a sub-frequency group is qualified if no downlink interference measurements were made since the last previous execution of the closed loop operation, and if the sub-frequency group meets the conditions (a) through (h) recited above, and also meets the following condition:

(i) only those sub-frequency groups containing a frequency tagged for use as a digital control channel are retained.

If no in step 546, the procedure next identifies in step 550 a list of qualified candidate sub-frequency groups (with respect to digital voice channels). In this step 550, a sub-frequency group is qualified if no downlink interference measurements were made since the last previous execution of the closed loop operation, and if the sub-frequency group meets the conditions (a) through (h) recited above, and also meets the following condition:

(j) only those sub-frequency groups not containing a frequency tagged for use as a digital control channel are retained.

Following completion of either steps 544, 548 or 550, the procedure next finds in step 552 a best qualified candidate sub-frequency group from a list of qualified sub-frequency groups. This step 552 determination is made by evaluating the measured uplink interference values for each candidate sub-frequency group and then choosing that sub-frequency group having the lowest $I_{up\_oss\_cand}$ interference value. A determination is then made in step 554 as to whether a best qualified candidate exists. If no, the procedure of step 530 ends.

If yes in step 554, the chosen sub-frequency group is validated in step 556. The validation action of step 556 involves applying the following validation rules against the chosen sub-frequency group:

(1) A determination is made as to whether the network validation check record (see, for comparison the record of FIG. 10) includes a "to" entry for selected frequencies whose channel equipment is currently blocked for maintenance (see, step 520, FIG. 12) where the "to" entry frequency is also contained in the chosen sub-frequency group. If yes, and if the new cell is within a certain threshold distance of the cell with the blocked channel equipment, the chosen sub-frequency group fails validation.

(2) A determination is made as to whether the network validation check record includes an entry resulting from the open loop processing (described above) for a cell within a certain threshold distance of the new cell and having either a "to" or "from" entry frequency that is also contained in the chosen sub-frequency group. If yes, the chosen sub-frequency group fails validation. For purposes of applying the foregoing rules (1) and (2), the certain threshold distance varies, and is a function of the coverage type of the cells at issue (for example, macro, micro or pico). The point of this determination is give proposals selected through the open loop process (as described above) priority over proposals selected through the closed loop process.

(3) Assuming one of the devices to be returned contains the digital control channel, a determination is made as to whether a frequency in the sub-frequency group to be validated for the new cell is currently assigned to the digital control channel of a neighbor's neighbor cell to that new cell. If yes, the chosen sub-frequency group fails validation. In this context, if cell A has cell B as a neighbor, and cell B has cell C as a neighbor, then cell A has cell C as a "neighbor's neighbor". The frequency to be validated comprises either the frequency tagged for the digital control channel, or the frequency of the candidate sub-frequency group having the lowest $I_{up\_oss\_cand}$ interference value.

(4) A determination is made as to whether a frequency in the sub-frequency group to be validated is assigned to one of the cells which is a neighbor in the same site as the new cell, or which generally has the same latitude and longitude as the new cell (for example, in an overlay/underlay situation, or sectorized cells of the same cell site). If yes, the chosen sub-frequency group fails validation.

(5) A determination is made as to whether one of the frequencies contained in the candidate sub-frequency group being validated is currently assigned to a neighbor's neighbor cell. If yes, the chosen sub-frequency group fails validation.

(6) A determination is made as to whether the network validation check record includes an entry resulting from the closed loop processing (as described herein) for another cell within a certain threshold distance and where one of the frequencies contained in the chosen sub-frequency group to which the new cell is to be returned matches one of the frequencies in the sub-frequency group identified in the "to" entry in the network validation check record for the other cell. If yes, the chosen sub-frequency group fails validation.

(7) With respect to other cells in the same site generally having the same latitude and longitude as the new cell, a determination is made as to whether a frequency in the candidate sub-frequency group is adjacent to one of the frequencies currently assigned to one of the other cells. If yes, the chosen sub-frequency group fails validation.

(8) With respect to other cells in the same site generally having the same latitude and longitude as the new cell, a determination is made as to whether the network validation check record includes an entry resulting from the closed loop processing (as described herein) for the other cell where a frequency in the candidate sub-frequency group is adjacent to a frequency in the "to" entry in the network validation check record for the other cell. If yes, the chosen sub-frequency group fails validation.

(9) With respect to other cells not generally having the same latitude and longitude as the new cell and which neighbor the new cell, a determination is made as to whether a frequency in the sub-frequency group to be validated is adjacent to one of the frequencies currently assigned to the other neighbor cells. If yes, the chosen sub-frequency group fails validation.

(10) With respect to other cells not generally having the same latitude and longitude as the new cell and which neighbor the new cell, a determination is made as to whether the network validation check record includes an entry resulting from the closed loop processing (as described herein) for the other cell where a frequency in the sub-frequency group to be validated is adjacent to a frequency in the "to" entry in the network validation check record for the other cell. If yes, the chosen sub-frequency group fails validation.

The procedure next checks in step 558 whether the validation of step 556 was failed. If yes, the chosen sub-frequency group is removed from the list of qualified sub-frequency groups in step 560, and the process returns to step 552 to chose the next best qualified candidate sub-frequency group. If validation was passed, on the other hand, the frequencies of the chosen sub-frequency group are assigned in step 562 to channel equipment in the new cell. A determination is then made in step 564 as to whether all channel equipment in the new cell have been assigned frequencies. If not, the list of selected sub-frequency groups is updated in step 566 with the new sub-frequency group that was just assigned, and the process returns to step 542. If yes, the procedure of step 530 ends.

Figure 15:
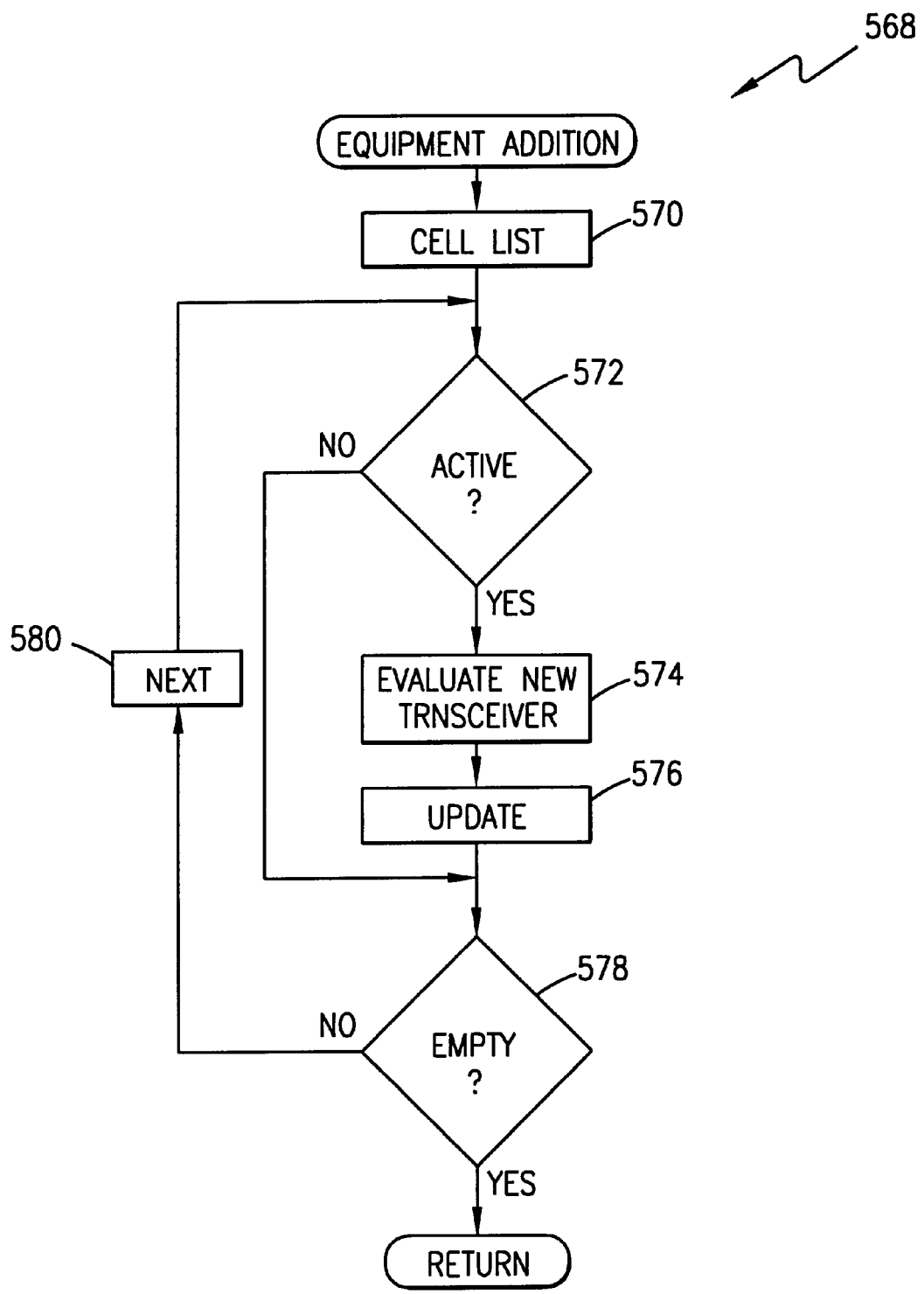
FIG. 15 is a flow diagram for the process of making frequency assignment to newly added transceivers.

Reference is now once again made to FIG. 12 for a further description of the closed loop algorithm. Next, in step 568, the closed loop algorithm handles the addition of new transceivers (channel equipment) to a cell of the network. Reference is now made to FIG. 15 wherein there is shown a flow diagram illustrating the process executed in connection with step 568 for handling the addition of new transceivers. The process first identifies a list of cells containing new transceivers (step 570). The new transceivers are generally detected by the operation support system (OSS). Next, in step 572, a determination is made as to whether a current one of the identified cells with new transceivers is active. If yes, a new transceiver evaluation procedure is executed (step 574) to determine frequency assignments for those transceivers. Following completion of the new transceiver evaluation procedure, the network validation check record (see, for comparison, the record of FIG. 10) is updated to account for the frequency assignments to those new transceivers (step 576). Thereafter, or if the current one of the cells is not active, a check is made in step 578 as to whether each of the step 570 identified cells has been processed. If not, the process returns (loop 580) to evaluate a next currently active cell from the list.

Figure 16:
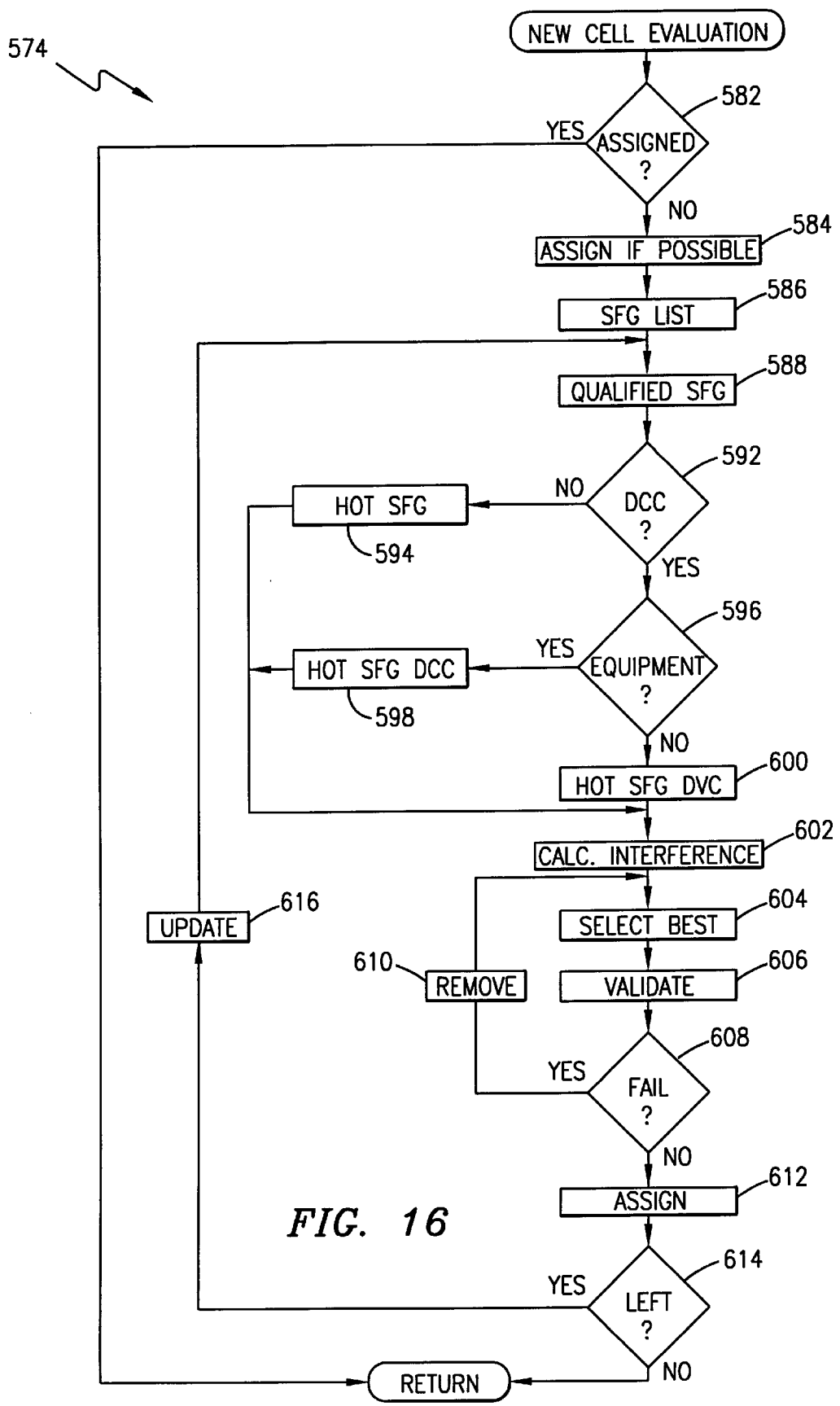
FIG. 16 is a flow diagram for the new transceiver evaluation procedure of FIG. 15.

Reference is now made to FIG. 16 wherein there is shown a flow diagram for the new transceiver evaluation procedure of FIG. 15, step 574. First, the procedure determines whether the new transceiver is currently assigned to a frequency from one of the sub-frequency groups having frequencies currently assigned to channel equipment of the associated cell (step 582). If so, no frequency re-assignment is necessary, and the evaluation process of step 574 ends. Otherwise, the evaluation process continues by next trying to assign to the new transceiver one of the presently unassigned frequencies from the sub-frequency groups currently assigned to the cell (step 584). If this is not possible, the procedure calculates in step 586 the following: for selected sub-frequency groups, $I_{up\_oss\_sel}$ (this is the same as open loop $I_{up\_sel\_eval}$ calculation), $BER_{up\_oss\_sel}$ (this is the same as open loop $BER_{up\_eval}$ calculation), and $BER_{dn\_oss\_sel}$ (this is the same as open loop $BER_{dn\_eval}$ calculation); and for each candidate sub-frequency group, $I_{up\_oss\_cand}$ (this is the same as open loop $I_{up\_cand\_eval}$ calculation), and $I_{dn\_oss\_sel}$ (this is the same as open loop $I_{dn\_cand\_prel}$ calculation). Next, in step 588, a list of qualified candidate sub-frequency groups is formed utilizing the conditions (a)–(j), as appropriate, in the same manner as set forth above in connection with steps 542, 544, 546, 548 and 550 of FIG. 14. In connection with the handling of conditions (g) and (h) for new transceivers, it is noted that there are no sub-frequency groups to be removed. Accordingly, the verifications are performed against all selected sub-frequency groups instead. Additionally, if more than one sub-frequency group must be added to the cell for the new transceivers, the verifications are performed against all chosen sub-frequency groups.

Next, a list of hot candidate sub-frequency groups is formed. A determination is first made in step 592 as to whether the frequency set for the cell contains at least one frequency tagged for use as a digital control channel. If no in step 592, the procedure next identifies in step 594 a list of hot candidate sub-frequency groups. In this step 594, a sub-frequency group is a hot candidate if downlink interference measurements were made since the last previous execution of the closed loop operation, and if the sub-frequency group meets the conditions (a)–(h) recited previously in connection with the execution of step 544, FIG. 14.

If yes in step 592, the procedure next in step 596 determines whether one of the unassigned pieces of channel equipment in the new cell contains a digital control channel. If yes in step 596, the procedure next identifies in step 598 a list of hot candidate sub-frequency groups (with respect to the sub-frequency group of the cell containing a digital control channel). In this step 598, a sub-frequency group is a hot candidate if downlink interference measurements were made since the last previous execution of the closed loop operation, and if the sub-frequency group meets the conditions (a)–(i) recited previously in connection with the execution of steps 544 and 548, FIG. 14.

If no in step 596, the procedure next identifies in step 600 a list of hot candidate sub-frequency groups (with respect to digital voice channels). In this step 600, a sub-frequency group is a hot candidate if no downlink interference measurements were made since the last previous execution of the closed loop operation, and if the sub-frequency group meets the conditions (a)–(h) recited previously in connection with the execution of step 544, FIG. 14, and meet the condition (j) recited previously in connection with the execution of step 550. Again, in connection with the handling of conditions (g) and (h) for new transceivers, it is noted that there are no sub-frequency groups to be removed.

Accordingly, the verifications are performed against all selected sub-frequency groups instead. Additionally, if more than one sub-frequency group must be added to the cell for the new transceivers, the verifications are performed against all chosen sub-frequency groups.

Following completion of either steps 594, 598 or 600, the procedure next calculates in step 602, for all sub-frequency groups for which downlink interference measurements were taken since the previous execution of the closed loop operation, an interference value ($I_{hot\_cand}$) in accordance with:

$$I_{hot\_cand} = \max(I_{up\_oss\_cand}, I_{dn\_oss\_cand} + I_{syst\_diff} - I_{hyst})$$

The terms $I_{up\_oss\_cand}$ and $I_{dn\_osscand}$ refer to the latest uplink and downlink values for the candidate sub-frequency group. The term $I_{syst\_diff}$ refers to the value calculated in step 518 (FIG. 12). The term $I_{hyst}$ refers to a hysteresis value representing how much more downlink interference is accepted before the interference value for the sub-frequency group is modified.

Next, in step 604, the best hot candidate sub-frequency group is selection (i.e., the hot candidate sub-frequency group with the lowest $I_{hot\_cand}$ value). If no such sub-frequency group exists, the best qualified candidate sub-frequency group is selected instead (i.e., the qualified candidate sub-frequency group with the lowest value of uplink interference). The chosen sub-frequency group (hot or qualified) is then validated in step 606. The validation action of step 606 involves applying the validation rules (1)–(10), recited previously in connection with the execution of step 556, FIG. 14, against the chosen sub-frequency group.

The procedure next checks in step 608 whether the validation of step 606 was failed. If yes, the chosen sub-frequency group is removed from the list of qualified sub-frequency groups in step 610, and the process returns to step 604 to chose another candidate sub-frequency group (hot or qualified). If validation was passed, on the other hand, the frequencies of the chosen sub-frequency group are assigned in step 612 to the new transceivers (channel equipment) in the cell. A determination is then made in step 614 as to whether all channel equipment in the cell have been assigned frequencies. If not, the list of selected sub-frequency groups is updated in step 616, and the process returns to step 588. If yes, the procedure of step 574 ends.

Figure 17:
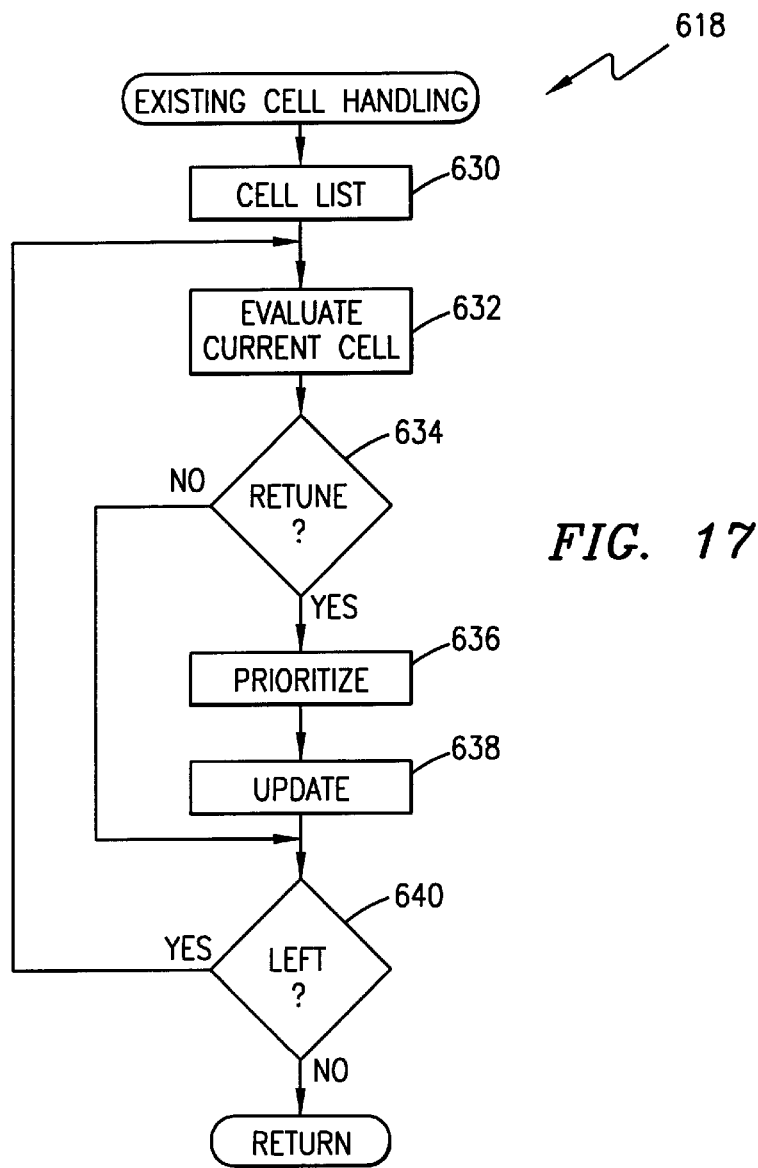
FIG. 17 is a flow diagram for the process of making frequency assignments to existing cells.

Reference is now once again made to FIG. 12 for a further description of the closed loop algorithm. Next, in step 618, the closed loop algorithm handles the existing cells of the network. Reference is now made to FIG. 17 wherein there is shown a flow diagram illustrating the process executed in connection with step 618 for handling existing cells. The process first identifies in step 630 a list of all active cells (except those new cells and those cells containing new transceivers which have been previously handled by the closed loop algorithm). Next, in step 632, a current cell evaluation procedure is executed to determine frequency assignments for a future retune. The procedure then determines in step 634 whether a retune is to be planned. If yes, the retune is prioritized in step 636. In connection with the prioritization of step 636, an existing cell must meet at least one of the following conditions in order to be considered for a retune:

(a) that cell meets a worst downlink or worst uplink digital control channel evaluation (described in more detail below), and a validated candidate sub-frequency group has been identified; or (b) that cell meets a worst downlink or worst uplink digital voice channel evaluation (described in more detail below), and a validated candidate sub-frequency group has been identified.

The foregoing step 636 conditions (a)–(b) are arranged in order of priority. In the event the cell meets more than one of the conditions, the condition with the highest priority is utilized for the retune procedure. A cell that satisfies at least one of the foregoing step 636 conditions is added to a proposed list of cells to be retuned. Prioritization of the cells added to the proposed list of cells to be retuned is effectuated in accordance with the coverage area of the cells (e.g., all macro-cells, followed by all micro-cells, followed by all pico-cells).

The worst downlink or worst uplink digital control channel evaluation for condition (a) involves a determination as to whether the sum of the hot candidate interference ($I_{hot\_cand}$) value and a worst case digital control channel interference hysteresis $I_{hyst\_dcc}$ value is less than the sum of an uplink interference $I_{up\_oss\_sel}$ value and a bit error rate penalty ($BER_{penalty}$) value. The result of this testing is the identification of a hot candidate sub-frequency group for inclusion on a list of hot candidate sub-frequency groups.

The worst downlink or worst uplink digital voice channel evaluation for condition (b) involves a determination as to whether the sum of the hot candidate interference ($I_{hot\_cand}$) value and a worst case digital voice channel interference hysteresis $I_{hyst\_dvc}$ value is less than the sum of an uplink interference $I_{up\_oss\_sel}$ value and a bit error rate penalty ($BER_{penalty}$) value. The result of this testing is the identification of a hot candidate sub-frequency group for inclusion on a list of hot candidate sub-frequency groups.

Following the prioritization of step 636, the procedure next updates the network validation check record (see, for comparison, the record of FIG. 10) to account for the frequency assignments (step 638). Thereafter, or if there is not a plan for a retune (see, step 634), a check is made in step 640 as to whether each of the step 630 identified cells has been processed. If not, the process returns (loop 642) to evaluate (step 632) a next currently active cell from the list. If yes, the existing cell handling procedure (step 618) ends.

Figure 18:
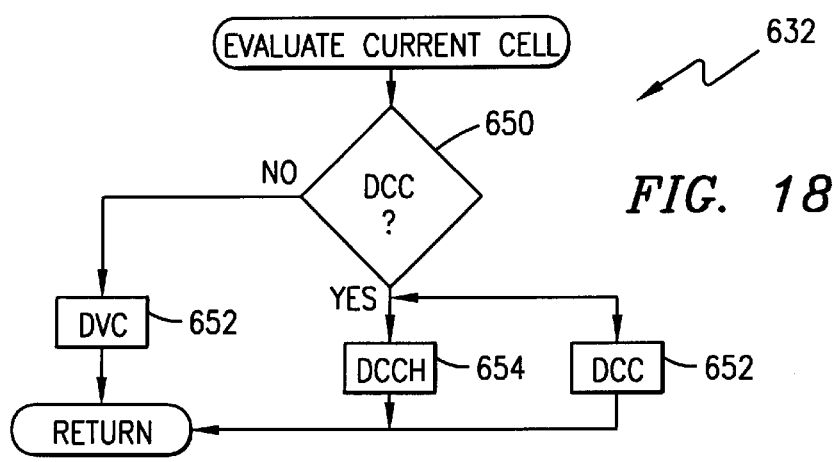
FIG. 18 is a flow diagram for the current cell evaluation procedure of FIG. 17.

Reference is now made to FIG. 18 wherein there is shown a flow diagram for the current cell evaluation procedure of FIG. 17, step 632. First, a determination is made in step 650 as to whether the frequency set for the cell being evaluated contains at least one frequency tagged for use as a digital control channel. If not, a worst digital voice channel evaluation procedure (to be described in more detail below) is executed in step 652. If yes in step 650, and if the frequency set contains frequencies tagged for digital control channel use, and if the cell contains a digital control channel, both the worst digital voice channel evaluation procedure of step 652 and a worst digital control channel evaluation procedure of step 654 must be performed. If, on the other hand, the frequency set contains frequencies tagged for digital control channel use, but the cell does not contain a digital control channel, only the digital voice channel evaluation procedure of step 652 must be performed. Following completion of steps 652 and/or 654, as necessary, the current cell evaluation procedure (step 632) ends.

Figure 19:
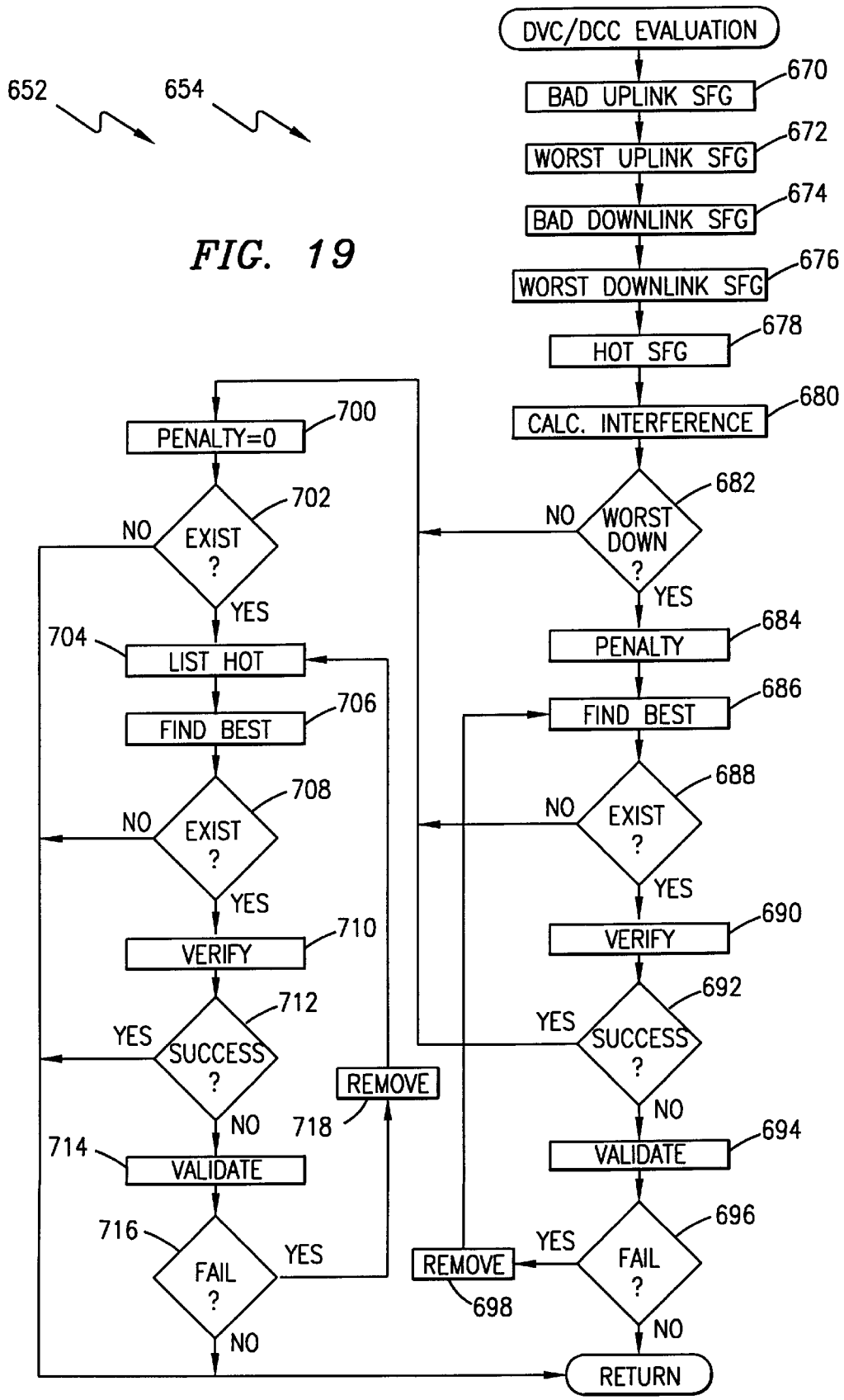
FIG. 19 is a flow diagram for a worst evaluation procedure of FIG. 18.

Reference is now made to FIG. 19 wherein there is shown a flow diagram for the evaluation procedures of FIG. 18, steps 652 or 654. The procedure first identifies in step 670 the bad uplink sub-frequency group. With respect to the evaluation procedure of step 652, this identification is made by finding that sub-frequency group assigned to the cell (i.e., selected) having only digital voice channels and for which the measured uplink bit error rate exceeds an uplink digital voice channel bit error rate threshold. With respect to the evaluation procedure of step 654, this identification is made by finding that sub-frequency group assigned to the cell (i.e., selected) having a frequency assigned to a digital control channel and for which the measured uplink bit error rate exceeds an uplink digital voice channel bit error rate threshold. The result of these actions is the generation of a list (for digital voice and control channels) of bad uplink sub-frequency groups for the cell.

Next, in step 672, an identification is made of the worst uplink sub-frequency group. With respect to the evaluation procedure of step 652, this identification is made by choosing amongst the list of bad uplink sub-frequency groups identified in step 670 that sub-frequency frequency group having the highest uplink interference value. With respect to the evaluation procedure of step 654 for a single digital control channel per cell structure, this identification comprises that sub-frequency group identified in step 670. In the event there exist more that one digital control channel per cell, the identification is instead made in the manner of the plural digital voice channels by choosing the one with the highest uplink interference value.

The procedure next in step 674 identifies the bad downlink sub-frequency group. With respect to the evaluation procedure of step 652, this identification is made by finding that active digital voice channel sub-frequency group assigned to the cell and for which the measured downlink bit error rate exceeds a downlink digital voice channel bit error rate threshold and the measured uplink digital voice channel bit error rate is less than or equal to an uplink bit error rate threshold. With respect to the evaluation procedure of step 654, this identification is made by finding that active digital control channel sub-frequency group assigned to the cell and for which the measured downlink bit error rate exceeds a downlink digital control channel bit error rate threshold and the measured uplink digital control channel bit error rate is less than or equal to an uplink bit error rate threshold. The result of these actions is the generation of a list (for digital voice and control channels) of bad downlink sub-frequency groups for the cell.

Next, in step 676, an identification is made of the worst downlink sub-frequency group. With respect to the evaluation procedure of step 652, this identification is made by choosing amongst the list of bad uplink sub-frequency groups identified in step 674 by choosing the digital voice channel sub-frequency group with the highest downlink bit error rate value. In the event two or more sub-frequency groups have the same downlink bit error rate value, identification is made of the one with the highest uplink bit error rate value. In the event two or more sub-frequency groups have the same uplink and downlink bit error rate values, identification is made of the one with the highest number of frequencies. With respect to the evaluation procedure of step 654 for a single digital control channel per cell structure, this identification comprises that sub-frequency group identified in step 674. In the event there exist more that one digital control channel per cell, the identification is instead made in the manner of the plural digital voice channels recited above by first choosing the one with the highest downlink bit error rate value.

The procedure next identifies in step 678 a list of hot candidate sub-frequency groups. For the step 652 digital voice channel evaluation procedure, a sub-frequency group is a hot candidate in step 678 if downlink interference measurements were taken for the current execution of the closed loop operation, and if the sub-frequency group meets the conditions (a)–(f) and (j) recited previously in connection with the execution of step 544, FIG. 14. For the step 654 digital control channel evaluation procedure, a sub-frequency group is a hot candidate in step 678 if downlink interference measurements were taken for the current execution of the closed loop operation, and if the sub-frequency group meets the conditions (a)–(f) and (i) recited previously in connection with the execution of step 550, FIG. 14.

The procedure next calculates in step 680, for all found hot sub-frequency groups, an interference value ($I_{hot\_cand}$) in accordance with:

$$I_{hot\_cand} = \max(I_{up\_oss\_cand}, I_{dn\_oss\_cand} + I_{syst\_diff} - I_{hyst})$$

The terms $I_{up\_oss\_cand}$ and $I_{dn\_oss\_cand}$ refer to the latest uplink and downlink values for the hot sub-frequency group. The term $I_{syst\_diff}$ refers to the value calculated in step 518 (FIG. 12). The term $I_{hyst}$ refers to a hysteresis value representing how much more downlink interference is accepted before the interference value for the sub-frequency group is modified.

A determination is next made in step 682 as to whether any worst downlink sub-frequency groups were identified in step 676. If yes, a bit error rate penalty is calculated in step 684. For the step 652 digital voice channel evaluation procedure, the bit error rate penalty comprises a first penalty value reflecting a value selected based on the uplink digital voice channel bit error rate threshold for the cell minus a second penalty value reflecting a value based on the measured uplink bit error rate for the worst interfered sub-frequency group of the cell. For the step 654 digital control channel evaluation procedure, the bit error rate penalty comprises a first penalty value reflecting a value selected based on the uplink digital control channel bit error rate threshold for the cell minus a second penalty value reflecting a value based on the measured uplink bit error rate for the worst interfered sub-frequency group of the cell.

Next, in step 686, the best hot candidate sub-frequency group is selected (i.e., the hot candidate sub-frequency group with the lowest $I_{hot\_cand}$ value). A determination is then made in step 688 as to whether such a best hot candidate was found. If yes, that best hot candidate is verified against a worst evaluation condition in step 690. For the step 652 digital voice channel evaluation procedure, the sum of the $I_{hot\_cand}$ value for the digital voice channel hot candidate sub-frequency group plus a digital voice channel interference hysteresis must be less than the sum of the measured uplink interference plus the bit error rate penalty. For the step 654 digital control channel evaluation procedure, the sum of the $I_{hot\_cand}$ value for the digital control channel hot candidate sub-frequency group plus a digital control channel interference hysteresis must be less than the sum of the measured uplink interference plus the bit error rate penalty. If worst evaluation condition is satisfied, the current hot candidate sub-frequency group is added to a worst evaluation success list. If, on the other hand, the worst evaluation condition is not satisfied, the current hot candidate sub-frequency group is added to a worst evaluation failure list.

A determination is then made in step 692 as to whether the step 690 verification against the worst evaluation condition was successful. If yes, the found hot sub-frequency group is then validated in step 694. The validation action of step 694 involves applying the validation rules (1)–(10), recited previously in connection with the execution of step 556, FIG. 14, against the found hot sub-frequency group.

The procedure next checks in step 696 whether the validation of step 694 was failed. If yes, the found hot sub-frequency group is removed from the list of hot sub-frequency groups in step 698, and the process returns to step 686 to select another best hot candidate sub-frequency group. If validation was passed, on the other hand, the found hot sub-frequency group is logged as the best sub-frequency group to be used in a planned retune of the existing cell, and the procedure ends.

In the event either no worst downlink sub-frequency groups were identified in step 682, or no best hot candidate sub-frequency group was found in step 688, or the step 690 verification against the worst evaluation condition was not successful, the procedure next sets the bit error rate penalty for the digital voice channel to zero in step 700. A determination is then made in step 702 as to whether any worst uplink sub-frequency groups were identified in step 672.

If yes, the procedure next identifies in step 704 a list of hot candidate sub-frequency groups. For the step 652 digital voice channel evaluation procedure, a sub-frequency group is a hot candidate in step 704 if downlink interference measurements were taken for the current execution of the closed loop operation, and if the sub-frequency group meets the conditions (a)–(f) and (j) recited previously in connection with the execution of step 544, FIG. 14. For the step 654 digital control channel evaluation procedure, a sub-frequency group is a hot candidate in step 704 if downlink interference measurements were taken for the current execution of the closed loop operation, and if the sub-frequency group meets the conditions (a)–(f) and (i) recited previously in connection with the execution of step 550, FIG. 14.

Next, in step 706, the best hot candidate sub-frequency group is selected (i.e., the hot candidate sub-frequency group with the lowest $I_{hot\_cand}$ value). A determination is then made in step 708 as to whether such a best hot candidate was found. If yes, that best hot candidate is verified against a worst evaluation condition in step 710. For the step 652 digital voice channel evaluation procedure, the sum of the $I_{hot\_cand}$ value for the digital voice channel hot candidate sub-frequency group plus a digital voice channel interference hysteresis must be less than the sum of the measured uplink interference plus the bit error rate penalty (which was set to zero). For the step 654 digital control channel evaluation procedure, the sum of the $I_{hot\_cand}$ value for the digital control channel hot candidate sub-frequency group plus a digital control channel interference hysteresis must be less than the sum of the measured uplink interference plus the bit error rate penalty (which was set to zero). If worst evaluation condition is satisfied, the current hot candidate sub-frequency group is added to a worst evaluation success list. If, on the other hand, the worst evaluation condition is not satisfied, the current hot candidate sub-frequency group is added to a worst evaluation failure list.

A determination is then made in step 712 as to whether the step 710 verification against the worst evaluation condition was successful. If yes, the found hot sub-frequency group is then validated in step 714. The validation action of step 714 involves applying the validation rules (1)–(10), recited previously in connection with the execution of step 556, FIG. 14, against the found hot sub-frequency group.

The procedure next checks in step 716 whether the validation of step 710 was failed. If yes, the found hot sub-frequency group is removed from the list of hot sub-frequency groups in step 718, and the process returns to step 704 to identify the list of hot candidate sub-frequency groups. If validation was passed, on the other hand, the found hot sub-frequency group is logged as the best sub-frequency group to be used in a planned retune of the existing cell, and the procedure ends. In the event either no worst uplink sub-frequency groups were identified in step 702, or no best hot candidate sub-frequency group was found in step 708, or the step 710 verification against the worst evaluation condition was not successful, the procedure ends.

Reference is now once again made to FIG. 12 for a further description of the closed loop algorithm. Next, in step 890, the closed loop algorithm generates a list of proposed cells to be updated. This list of proposed cells is built in the following order: first, all cells to be retuned in connection with the removal of one or more transceivers (see, step 522); second, all new cells to be retuned (see, step 524); third, all cells to be retuned in order to add one or more transceivers (see, step 568); and fourth, the existing cells to be retuned (see, step 618). A separate list of cells to be retuned is generated for each mobile switching center from the proposed list of cells. In instances where a cell on the proposed list of cells is not included in one of the mobile switching center specific lists of cells, any entry in the network validation check record (see, for comparison, the record of FIG. 10) relating thereto is deleted. Following completion of step 890, execution of the closed loop algorithm (step 512) ends.

MAHO Handling

Figure 20:
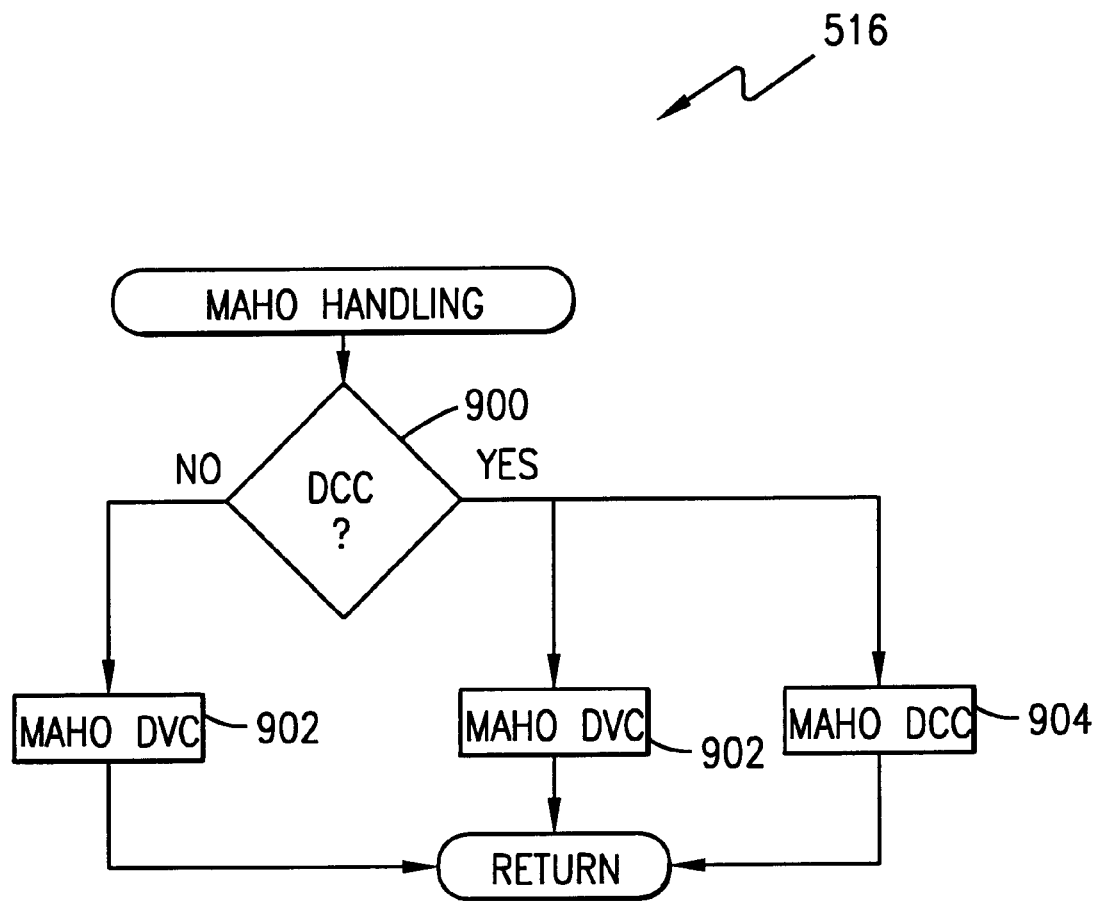
FIG. 20 is a flow diagram for the mobile assisted hand-off (MAHO) handling procedure of FIG. 12.

As mentioned previously, following completion of the closed loop algorithm and the network update, mobile assisted hand-off (MAHO) handling is implemented in step 516. Reference is now made to FIG. 20 wherein there is shown a flow diagram for the mobile assisted hand-off (MAHO) handling procedure of FIG. 12, step 516. First, a determination is made in step 900 as to whether the frequency set for the cell being evaluated contains at least one frequency tagged for use as a digital control channel. If not, a digital voice channel MAHO evaluation procedure (to be described in more detail below) is executed in step 902. If yes, separate digital voice channel and digital control channel MAHO evaluation procedures (each to be described in more detail below) are executed as needed in steps 902 and/or 904, respectively. If the frequency set contains frequencies tagged for digital control channel use, and if the cell contains a digital control channel, both of the procedures in step 902 and 904 must be performed. If, on the other hand, the frequency set contains frequencies tagged for digital control channel use, but the cell does not contain a digital control channel, only the digital voice channel evaluation procedure of step 902 must be performed. Following completion of steps 902 and/or 904, as necessary, an update is performed in step 908 of the mobile switching center extra MAHO list. This list identifies the list of frequencies to be measured for downlink interference for the cell being evaluated. The update involves adding the list of frequencies for digital control channel extra MAHO measurement to the list of frequencies for digital voice channel as generated in steps 902 and/or 904. The MAHO handling procedure (step 516) then ends.

Figure 21:
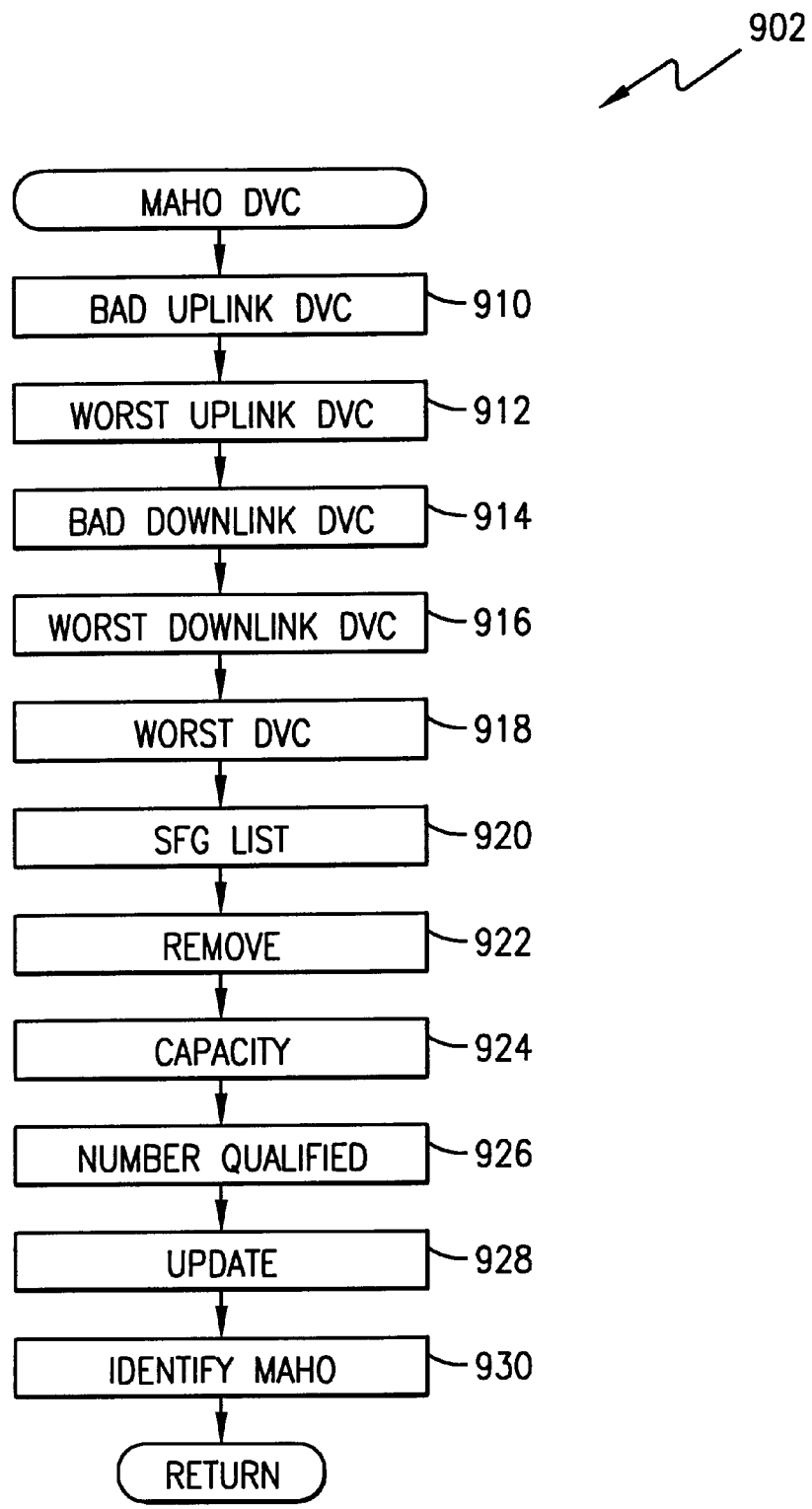
FIGS. 21 and 22 are flow diagrams for the MAHO evaluation procedures of FIG. 20.

Reference is now made to FIG. 21 wherein there is shown a flow diagram for the digital voice channel MAHO evaluation procedure of FIG. 20, step 902. The procedure first identifies in step 910 the bad uplink digital voice channel sub-frequency group(s). This identification is made by finding that active digital voice channel sub-frequency group assigned to the cell and for which the measured uplink bit error rate exceeds an uplink digital voice channel bit error rate threshold. The result of this action is the generation of a list (for digital voice channels) of bad uplink sub-frequency groups for the cell.

Next, in step 912, an identification is made of the worst uplink digital voice channel sub-frequency group. This identification is made by choosing amongst the list of bad uplink sub-frequency groups identified in step 910 that sub-frequency group having the highest uplink interference value.

The procedure next in step 914 identifies the bad downlink digital voice channel sub-frequency group. This identification is made by finding that active digital voice channel sub-frequency group assigned to the cell and for which the measured downlink bit error rate exceeds a downlink digital voice channel bit error rate threshold and the measured uplink digital voice channel bit error rate is less than or equal to an uplink bit error rate threshold. The result of this action is the generation of a list (for digital voice channels) of bad downlink sub-frequency groups for the cell.

Next, in step 916, an identification is made of the worst downlink digital voice channel sub-frequency group. This identification is made by choosing amongst the list of bad uplink sub-frequency groups identified in step 914 the digital voice channel sub-frequency group with the highest downlink bit error rate value. In the event two or more sub-frequency groups have the same downlink bit error rate value, identification is made of the one with the highest uplink bit error rate value. In the event two or more sub-frequency groups have the same uplink and downlink bit error rate values, identification is made of the one with the highest number of frequencies.

The procedure next identifies in step 918 a list of the worst digital voice channel sub-frequency groups. This list comprises those worst sub-frequency groups identified in steps 912 and 916.

The procedure next identifies in step 920 a list of qualified candidate digital voice channel sub-frequency groups. A sub-frequency group is a qualified candidate in step 920 if the sub-frequency group meets the conditions (a), (c)–(f) and (j) recited previously in connection with the execution of step 544, FIG. 14, as well as the following two conditions:

(1) the number of non-barred frequencies in the candidate digital voice channel sub-frequency group is between a certain minimum (comprising the number of assigned frequencies in the selected sub-frequency group with the least number of frequencies) and a certain maximum (comprising the size of the largest sub-frequency group plus one); and (2) minimum channel separation must be verified such that the candidate sub-frequency group must meet minimum channel separation with respect to all the selected sub-frequency groups within the cell (including the digital control channel sub-frequency group) and excepting those sub-frequency groups on the step 918 list.

The list of qualified candidate sub-frequency groups is then pruned in step 922 to remove all sub-frequency groups that are currently assigned to a neighbor cell of the cell at issue.

A calculation is then made in step 924 of the MAHO measurement capacity of the cell at issue (i.e., the total number of candidate frequencies ($NM_{tot}$) that can be measured at the next closed loop evaluation). For the step 902 digital voice channel MAHO evaluation procedure, this step 924 calculation is made as follows:

If XCAP is less than or equal to zero, then:

$$NM_{tot} = NM_{min};$$

otherwise:

$$NM_{tot} = \text{floor}((XCAP \times \text{candperc})/N_{mc\_pre}) + NM_{min}, \text{ but not greater than } 128;$$

wherein:

floor(x) refers to the action of rounding up to the previous whole number;

$$SFG_{size\_dcch} = \text{size of the worst digital control channel sub-frequency group (for the cell)} + 1;$$

$$SFG_{size\_dvc} = \text{size of the worst digital voice channel sub-frequency group (for the cell)} + 1;$$

$$NM_{min\_dcch} = 2 \times SFG_{size\_dcch};$$

$$NM_{min\_dvc} = 2 \times SFG_{size\_dvc};$$

$$NM_{min} = NM_{min\_dcch} + NM_{min\_dvc};$$

$$CAP_{min} = NM_{min} \times (N_{sam\_maho} \times MAHO_{factor});$$

$$N_{mc\_last\_min} = \min(N_{mc\_1}, N_{mc\_2}, \ldots, N_{mc\_end});$$

where: $N_{mc\_x}$ is the number of measuring cycles for reporting program x;

$$CAP_{current} = N_{mc\_last\_min} \times N_{extraMAHO};$$

$$XCAP = CAP_{current} - CAP_{min};$$

$N_{extraMAHO}$ = number of extra MAHO frequencies from the last closed loop evaluation;

$$N_{mc\_pre} = (XCAP \times (1 - \text{candperc})/NM_{min}) + (N_{sam\_MAHO} \times MAHO_{factor});$$

$N_{sam\_MAHO}$ = a configuration parameter giving the minimum number of samples in one measurement for extra MAHO measurements that are required for each measurement frequency;

$MAHO_{factor}$ = a configuration parameter to ensure that more than a minimum number of samples will be received; and candperc = a percentage of the extra capacity which can be used for adding new candidate channels.

A calculation is then made in step 926 of the number of qualified candidate frequencies ($NQ_m$) to be measured for downlink interference at the next closed loop evaluation. For the step 902 digital voice channel MAHO evaluation procedure, this step 926 calculation is made as follows:

$$NQ_{m\_dcch} = \min(NQ_{dcch\_current}, NQ_{m\_dcch\_max})$$

$$NQ_{m\_dvc} = \min(NQ_{dvc\_current}, NQ_{m\_dvc\_max})$$

wherein:

$NQ_{dcch\_current}$ = the total number of frequencies contained in the list of qualified digital control channel candidate sub-frequency groups (see, step 920);

$NQ_{m\_dcch\_max} = \max(SFG_{size\_dcch}, (NM_{dcch} - NH_{m\_dcch}))$ = the maximum number of qualified digital control channel candidate frequencies that can be measured for downlink interference at the next closed loop evaluation;

$NQ_{dvc\_current}$ = the total number of frequencies contained in the list of qualified digital voice channel candidate sub-frequency groups (see, step 920); and $NQ_{m\_dvc\_max} = \max(SFG_{size\_dvc}, (NM_{dvc} - NH_{m\_dvc}))$ = the maximum number of qualified digital voice channel candidate frequencies that can be measured for downlink interference at the next closed loop evaluation.

The qualified MAHO list is then updated in step 928. The qualified MAHO list comprises the sub-frequency groups taken from the list of qualified candidate sub-frequency groups sorted in accordance with increasing value of uplink interference (for further handling in a first in, first out (FIFO) manner). The step 928 update involves the step of inserting, in increasing order of candidate uplink interference value, the new qualified candidate sub-frequency groups (i.e., a sub-frequency group which is part of the list of qualified candidate sub-frequency groups of step 922, and which is not part of the previous qualified MAHO list). Also, step 928 involves the removal of the old qualified sub-frequency groups (i.e., a sub-frequency group which is part of the previous qualified MAHO list, and which is not part of the current list of qualified candidate sub-frequency groups of step 922). Following the updating, the procedure next identifies in step 930 a list of qualified candidate frequencies for extra MAHO measurement. The qualified candidate sub-frequency groups that form the step 930 list are selected as follows:

(1) from the list of qualified candidate MAHO evaluation sub-frequency groups of step 928, select the sub-frequency group at the top of list;

(2) add the frequencies from the selected sub-frequency group to the measurement list;

(3) determine whether adding the frequencies from the next best sub-frequency group would exceed $NQ_m$; and (4) if not, repeat steps (2) and (3) until the maximum number of sub-frequency groups has been reached.

Figure 22:
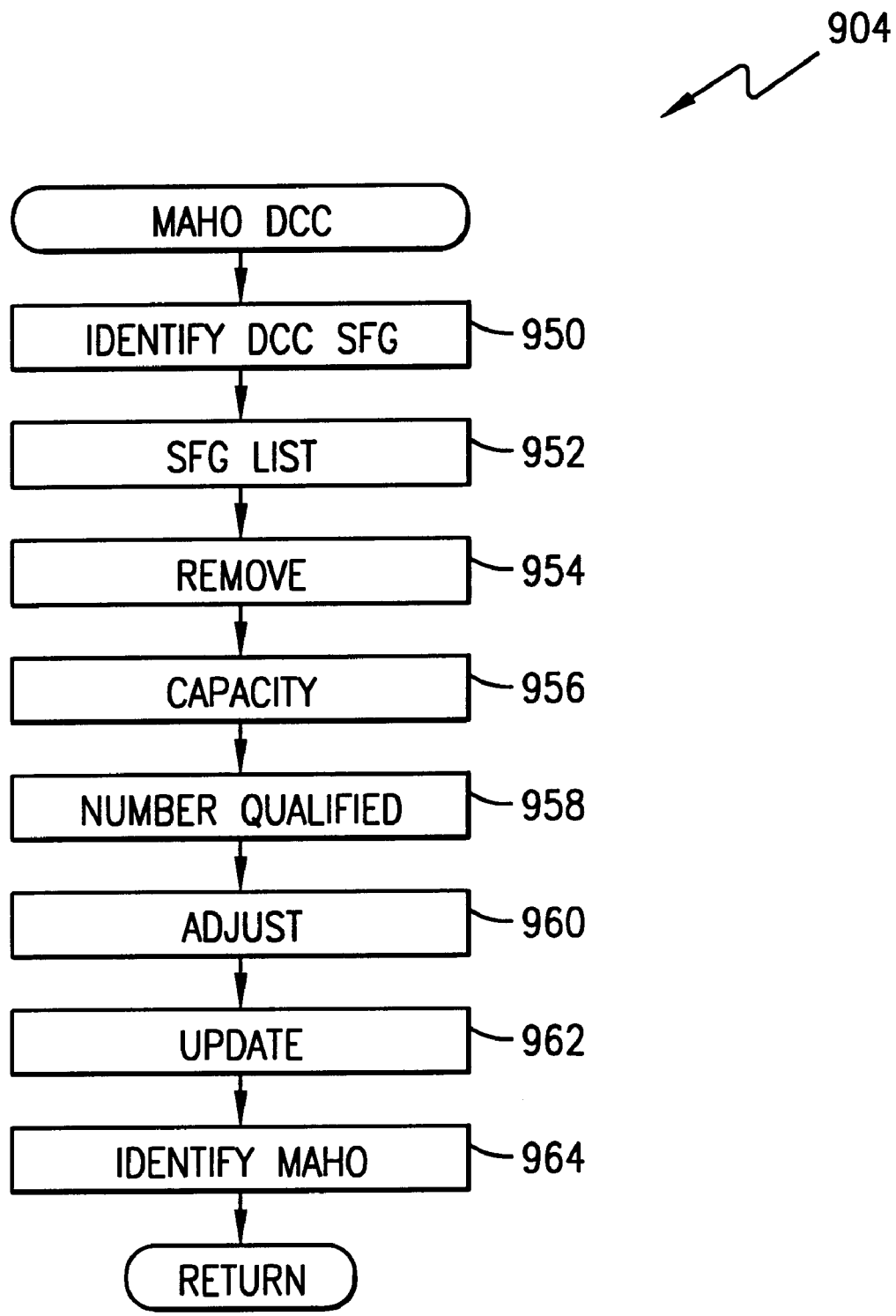

Reference is now made to FIG. 22 wherein there is shown a flow diagram for the digital control channel MAHO evaluation procedure of FIG. 20, step 904. It should be noted here that the procedure of FIG. 22 is for a single digital control channel per cell structure. In the event there exist more that one digital control channel per cell, the procedure of FIG. 21 is instead made to take into account the plural digital voice channels.

The procedure of FIG. 22 first identifies in step 950 the digital control channel sub-frequency group for the cell. The procedure next identifies in step 952 a list of qualified candidate digital control channel sub-frequency groups. A sub-frequency group is a qualified candidate in step 952 if the sub-frequency group meets the conditions (a), (b)–(f) and (i) recited previously in connection with the execution of step 544, FIG. 14, as well as the following two conditions:

(1) the number of frequencies in the candidate digital control channel sub-frequency group is between a certain minimum (comprising the number of assigned frequencies in the selected sub-frequency group) and a certain maximum (comprising the size of the selected sub-frequency group plus one); and (2) minimum channel separation must be verified such that the candidate sub-frequency group must meet minimum channel separation with respect to all the selected sub-frequency groups within the cell (except the digital control channel sub-frequency group).

The list of qualified candidate sub-frequency groups is then pruned in step 954 to remove all sub-frequency groups that are currently assigned to a neighbor cell.

A calculation is then made in step 956 of the MAHO measurement capacity of the cell at issue (i.e., the total number of candidate frequencies ($NM_{tot}$) that can be measured at the next closed loop evaluation). For the step 904 digital control channel MAHO evaluation procedure, this step 956 calculation is made as follows:

If XCAP is less than or equal to zero, then:

$$NM_{tot}=NM_{min};$$

otherwise:

$$NM_{tot}=\text{floor}((XCAP \times \text{candperc})/N_{mc\_pre})+NM_{min}, \text{ but not greater than } 128;$$

wherein: floor(x) refers to the action of rounding up to the previous whole number;

$SFG_{size\_dcch}$=size of the worst digital control channel sub-frequency group (for the cell)+1;

$SFG_{size\_dvc}$=size of the worst digital voice channel sub-frequency group (for the cell)+1;

$NM_{min\_dcch}=2 \times SFG_{size\_dcch}$;

$NM_{min\_dvc}=2 \times SFG_{size\_dvc}$;

$NM_{min}=NM_{min\_dcch}+NM_{min\_dvc}$;

$CAP_{min}=NM_{min} \times (N_{sam\_maho} \times MAHO_{factor})$;

$N_{mc\_last\_min}=\min(N_{mc\_1}, N_{mc\_2}, \ldots, N_{mc\_end})$;

where: $N_{mc\_x}$ is the number of measuring cycles for reporting program x;

$CAP_{current}=N_{mc\_last\_min} \times N_{extraMAHO}$;

$XCAP=CAP_{current}-CAP_{min}$;

$N_{extraMAHO}$=number of extra MAHO frequencies from the last closed loop evaluation;

$N_{mc\_pre}=(XCAP \times (1-\text{candperc})/NM_{min})+(N_{sam\_MAHO} \times MAHO_{factor})$ $N_{sam\_MAHO}$=a configuration parameter giving the minimum number of samples in one measurement for extra MAHO measurements that are required for each measurement frequency;

$MAHO_{factor}$=a configuration parameter to ensure that more than a minimum number of samples will be received; and candperc=a percentage of the extra capacity which can be used for adding new candidate channels.

A calculation is then made in step 958 of the number of qualified candidate frequencies ($NQ_m$) to be measured for downlink interference at the next closed loop evaluation. For the step 904 digital control channel MAHO evaluation procedure, this step 958 calculation is made as follows:

$$NQ_{m\_dcch}=\min(NQ_{dcch\_current}, NQ_{m\_dcch\_max})$$

$$NQ_{m\_dvc}=\min(NQ_{dvc\_current}, NQ_{m\_dvc\_max})$$

wherein:

$NQ_{dcch\_current}$=the total number of frequencies contained in the list of qualified digital control channel candidate sub-frequency groups (see, step 952);

$NQ_{m\_dcch\_max}=\max(SFG_{size\_dcch}, (NM_{dcch}-NH_{m\_dcch}))=$ the maximum number of qualified digital control channel candidate frequencies that can be measured for downlink interference at the next closed loop evaluation;

$NQ_{dvc\_current}$–the total number of frequencies contained in the list of qualified digital voice channel candidate sub-frequency groups (see, step 952); and $NQ_{m\_dvc\_max} = \max(SFG_{size\_dvc}, (NM_{dvc} - NH_{m\_dvc})) =$ the maximum number of qualified digital voice channel candidate frequencies that can be measured for downlink interference at the next closed loop evaluation.

The procedure then adjusts the $NQ_m$ value in step 960 to account for the number of candidate frequencies identified in FIG. 21, step 926, which are also being specified for MAHO measurement.

The qualified MAHO list is then updated in step 962. The qualified MAHO list comprises the sub-frequency groups taken from the list of qualified candidate sub-frequency groups sorted in accordance with increasing value of uplink interference (for further handling in a first in, first out (FIFO) manner). The step 962 update involves the step of inserting, in increasing order of candidate uplink interference value, the new qualified candidate sub-frequency groups (i.e., a sub-frequency group which is part of the list of qualified candidate sub-frequency groups of step 954, and which is not part of the previous qualified MAHO list). Also, step 962 involves the removal of the old qualified sub-frequency groups (i.e., a sub-frequency group which is part of the previous qualified MAHO list, and which is not part of the current list of qualified candidate sub-frequency groups of step 954). Following the updating, the procedure next identifies in step 964 a list of qualified candidate frequencies for extra MAHO measurement. The qualified candidate sub-frequency groups that form the step 964 list are selected as follows:

(1) from the list of qualified candidate MAHO evaluation sub-frequency groups, select the sub-frequency group at the top of list;

(2) add the frequencies from the selected sub-frequency group to the measurement list;

(3) determine whether adding the frequencies from the next best sub-frequency group would exceed $NQ_m$; and (4) if not, repeat steps (2) and (3) until the maximum number of sub-frequency groups has been reached.

Although the method and apparatus of the present invention has been illustrated in the accompanying Drawings and described in the foregoing Detailed Description, it will be understood that the invention is not limited to the embodiment(s) disclosed, but is capable of numerous rearrangements, modifications and substitutions without departing from the spirit of the invention as set forth and defined by the following claims.

What is claimed is:

1. A method for automated and autonomous planning of a revision to a frequency plan assignment within a cellular communications system in response to a situation wherein a certain transceiver within a certain cell has been maintenance blocked as not operable, comprising the steps of:

marking, due to the maintenance block, of a certain frequency assigned to that certain transceiver in the certain cell;

evaluating communications quality within the cellular communications system;

selecting based on the evaluated communications quality a revision to the frequency plan assignment, wherein the step of selecting further includes the steps of:
checking for marked frequencies; and
preventing another cell of the system proximate to the certain cell from being reallocated use of the marked certain frequency assigned to that certain transceiver in the certain cell.

2. A method for automated and autonomous planning of a revision to a frequency plan assignment within a cellular communications system in a situation wherein a certain one of a plurality of transceivers within a certain cell is to be removed from operation, comprising the steps of:

evaluating communications quality within the cellular communications system with respect to frequencies currently allocated to the plurality of transceivers within the certain cell;

selecting based on the evaluated communications quality a revision to the frequency plan assignment, wherein the step of selecting further includes the steps of:
identifying a to be retained one of the plurality of transceivers allocated a frequency with an evaluated communications quality worse than an evaluated communications quality of a frequency allocated to the certain one of the transceivers to be removed from operation; and
exchanging within the certain cell the allocated frequencies of the to be retained one of the plurality of transceivers and the certain one of the transceivers to be removed from operation.

3. A method for automated and autonomous planning of a revision to a frequency plan assignment within a cellular communications system in a situation wherein a new cell has been added to the cellular communications system, comprising the steps of:

evaluating communications quality within the cellular communications system with respect to sub-frequency groups currently allocated within the cellular communications system;

selecting based on the evaluated communications quality a revision to the frequency plan assignment, wherein the step of selecting further includes the steps of:
identifying candidate ones of the sub-frequency groups;
evaluating the candidate sub-frequency groups to identify a best candidate sub-frequency group;
validating the identified best candidate sub-frequency group; and
assigning frequencies within the validated best candidate sub-frequency group to transceivers within the recognized new cell.

4. The method as in claim 3 wherein the step of identifying candidate ones of the sub-frequency groups comprises the steps of:

identifying sub-frequency groups not selected for that cell; and choosing those identified sub-frequency groups which are compatible with any existing selected sub-frequency groups for that cell.

5. The method as in claim 3 wherein the step of evaluating the candidate sub-frequency groups comprises the step of choosing a least uplink interfered one of the candidate sub-frequency groups.

6. The method as in claim 3 wherein the step of validating the identified best candidate sub-frequency group comprises the steps of:

confirming that the best candidate sub-frequency group is compatible with an existing frequency plan state of the communications system; and confirming that the best candidate sub-frequency group is compatible with any currently pending proposals for revision to the existing frequency plan.

7. The method as in claim 3 further including the steps of:

determining whether all transceivers within the recognized new cell have been assigned frequencies; and if not, repeating the step of selecting to assign additional frequencies to transceivers of the new cell.

8. The method as in claim 3 wherein the step of assigning frequencies comprises the step of assigning a least interfered one of the frequencies to the transceiver supporting a control channel for the new cell.

9. The method as in claim 3 wherein the step of assigning frequencies comprises the step of assigning a frequency tagged for control channel use to the transceiver supporting a control channel for the new cell.

10. A method for automated and autonomous planning of a revision to a frequency plan assignment within a cellular communications system in a situation wherein a new transceiver has been added to a cell of the cellular communications system, comprising the steps of:
    evaluating communications quality within the cellular communications system with respect to sub-frequency groups currently allocated within the cellular communications system;
    selecting based on the evaluated communications quality a revision to the frequency plan assignment, wherein the step of selecting further includes the steps of:
        identifying candidate ones of the sub-frequency groups;
        evaluating the candidate sub-frequency groups to identify a best candidate sub-frequency group;
        validating the identified best candidate sub-frequency group; and
        assigning frequencies within the validated best candidate sub-frequency group to the new transceiver.

11. The method as in claim 10 wherein the step of identifying qualified ones of the sub-frequency groups comprises the steps of:
    identifying sub-frequency groups not selected for that cell; and
    choosing those identified sub-frequency groups which are compatible with any existing selected sub-frequency groups for that cell.

12. The method as in claim 10 wherein the step of evaluating the qualified sub-frequency groups comprises the steps of:
    choosing a least uplink and downlink interfered one of the candidate sub-frequency groups; and
    if none, then choosing a least uplink interfered one of the candidate sub-frequency groups.

13. The method as in claim 10 wherein the step of validating the identified best qualified sub-frequency group comprises the steps of:
    confirming that the best candidate sub-frequency group is compatible with an existing frequency plan state of the communications system; and
    confirming that the best candidate sub-frequency group is compatible with any currently pending proposals for revision to the existing frequency plan.

14. The method as in claim 10 wherein the step of assigning frequencies comprises the step of assigning a least interfered one of the frequencies to the transceiver supporting a control channel for the new cell.

15. The method as in claim 10 wherein the step of assigning frequencies comprises the step of assigning a frequency tagged for control channel use to the transceiver supporting a control channel for the new cell.

16. A method for automated and autonomous planning of a revision to a frequency plan assignment within a cellular communications system, comprising the steps of:
    evaluating communications quality within the cellular communications system with respect to sub-frequency groups currently allocated within the cellular communications system;
    identifying a worst sub-frequency group associated with a certain cell;
    selecting based on the evaluated communications quality a revision to the frequency plan assignment with respect to that certain cell, wherein the step of selecting further includes the steps of:
        identifying a best candidate sub-frequency group;
        validating the best candidate sub-frequency group; and
        assigning frequencies within the validated best candidate sub-frequency group to each transceiver within the certain cell in order to replace the frequencies of the identified worst sub-frequency group associated with the certain cell.

17. The method as in claim 16 wherein the step of identifying a worst sub-frequency group comprises the step of identifying the certain cell having a worst interference condition.

18. The method as in claim 16 wherein the step of identifying the best candidate sub-frequency group comprises the step of choosing a least uplink and downlink interfered one of the candidate sub-frequency groups.

19. The method as in claim 16 wherein the step of validating the identified best candidate sub-frequency group comprises the steps of:
    confirming that the best candidate sub-frequency group is compatible with an existing frequency plan state of the communications system; and
    confirming that the best candidate sub-frequency group is compatible with any currently pending proposals for revision to the existing frequency plan.

20. The method as in claim 16 wherein the step of assigning frequencies comprises the step of assigning a least interfered one of the frequencies to the transceiver supporting a control channel for the new cell.

21. The method as in claim 16 wherein the step of assigning frequencies comprises the step of assigning a frequency tagged for control channel use to the transceiver supporting a control channel for the new cell.

22. The method as in claim 16 wherein the step of selecting the revision to the frequency plan assignment with respect to that certain cell gives independent consideration to both uplink and downlink in making revision selections such that:
    the step of identifying a worst sub-frequency group comprises the step of identifying the certain cell having a worst downlink interference condition; and
    if no certain cell having a worst downlink interference condition is identified, then the step of identifying a worst sub-frequency group comprises the step of identifying the certain cell having a worst uplink interference condition.

23. The method as in claim 22 wherein the step of selecting the revision by giving independent consideration to both uplink and downlink further comprises responding to identifying the certain cell having a worst downlink interference condition such that:
    the step of identifying the best candidate sub-frequency group comprises the step of choosing a least downlink interfered one of the candidate sub-frequency groups; and
    the step of validating the identified best candidate sub-frequency group comprises the steps of:
        confirming that the best candidate sub-frequency group is compatible with an existing downlink frequency plan state of the communications system; and confirming that the best candidate sub-frequency group is compatible with any currently pending proposals for revision to the existing downlink frequency plan.

24. The method as in claim 23 wherein the step of assigning frequencies comprises the step of assigning frequencies from the validated best candidate sub-frequency group for downlink transceiver use.

25. The method as in claim 22 wherein the step of selecting the revision by giving independent consideration to both uplink and downlink further comprises responding to identifying the certain cell having a worst uplink interference condition such that:

the step of identifying the best candidate sub-frequency group comprises the step of choosing a least uplink interfered one of the candidate sub-frequency groups; and the step of validating the identified best candidate sub-frequency group comprises the steps of:

confirming that the best candidate sub-frequency group is compatible with an existing uplink frequency plan state of the communications system; and confirming that the best candidate sub-frequency group is compatible with any currently pending proposals for revision to the existing uplink frequency plan.

26. The method as in claim 25 wherein the step of assigning frequencies comprises the step of assigning frequencies from the validated best candidate sub-frequency group for uplink transceiver use.

27. A method for planning a revision to a frequency plan assignment within a cellular communications system, comprising the steps of:

generating first proposals for revision to the frequency plan assignment in an open loop evaluation process which supports system operator consideration and input;

generating second proposals for revision to the frequency plan assignment in a closed loop evaluation process which is autonomous to and independent of system operator consideration and input;

choosing among the first and second proposals for implementation in revising the frequency plan assignment.

28. The method as in claim 27 wherein the step of choosing comprises the steps of:

selecting a first or second proposal for implementation;

considering a system effect of a first of second proposal selected for implementation on any subsequently generated first or second proposals.

29. The method as in claim 27 wherein the step of choosing comprises the step of giving priority to a first proposal over a second proposal.

30. The method as in claim 27 wherein the step of generating first proposals gives consideration to previously generated first and second proposals.

31. The method as in claim 27 wherein the step of generating second proposals gives consideration to previously generated first and second proposals.

32. A method for automated and autonomous planning of a revision to a frequency plan assignment within a cellular communications system, comprising the steps of:

determining whether a frequency set of a certain cell contains at least one frequency tagged for use as a digital control channel;

if yes, separately evaluating communications quality within the cellular communications system with respect to digital voice channel and digital control channel sub-frequency groups currently allocated within the cellular communications system in order to identify a potential best candidate digital voice channel and digital control channel sub-frequency group having frequencies suitable for assignment to transceivers within the certain cell in order to replace the frequencies of a digital voice channel and digital control channel, respectively, sub-frequency group currently associated with the certain cell; and if no, evaluating communications quality within the cellular communications system with respect to digital voice channel sub-frequency groups currently allocated within the cellular communications system to identify a best candidate digital voice channel sub-frequency group having frequencies suitable for assignment to transceivers within the certain cell in order to replace the frequencies of a digital voice channel sub-frequency group currently associated with the certain cell.

33. The method as in claim 32 wherein the step of separately evaluating comprises the steps of:

identifying a worst digital voice channel sub-frequency group associated with the certain cell;

selecting based on the evaluated communications quality a best candidate digital voice channel sub-frequency group;

validating the best candidate digital voice channel sub-frequency group to identify frequencies for assignment to each transceiver within the certain cell in order to replace the frequencies of the identified worst digital voice channel sub-frequency group associated with the certain cell;

identifying a worst digital control channel sub-frequency group associated with the certain cell;

selecting based on the evaluated communications quality a best candidate digital control channel sub-frequency group; and validating the best candidate digital control channel sub-frequency group to identify frequencies for assignment to each transceiver within the certain cell in order to replace the frequencies of the identified worst digital control channel sub-frequency group associated with the certain cell.

34. The method as in claim 33 further including the step of giving prioritization to the best candidate digital control channel sub-frequency group over the best candidate digital voice channel sub-frequency group in assigning frequencies for implementing the revision to the frequency plan assignment.

35. A method for automated and autonomous planning of a revision to a frequency plan assignment within a cellular communications system for a certain cell, comprising the steps of:

identifying a first list of sub-frequency groups characterized as being highly interfered on either an uplink or downlink;

identifying a second list of sub-frequency groups characterized as being currently assigned to a neighbor cell of the certain cell;

identifying a third list of sub-frequency groups characterized as being potential candidate sub-frequency groups for assignment to the certain cell in a revision to the frequency plan, provided that the third list does not include any of the sub-frequency groups contained in the first and second lists;

ordering mobile stations operating within the certain cell to make downlink interference measurements on frequencies comprising the sub-frequency groups contained in the third list;

selecting based on the uplink and downlink communications quality a best candidate sub-frequency group from the third list;

validating the best candidate digital voice channel sub-frequency group; and assigning frequencies of the validated best candidate sub-frequency group to each transceiver within the certain cell.

36. The method as in claim 35 wherein the step of ordering comprises the step of taking into account traffic capacity in the certain cell in order to make a sufficient number of downlink interference measurements.

37. The method as in claim 35 wherein the step of ordering comprises the step of rotating through the sub-frequency groups within the third list in order to make downlink interference measurement over each of the included sub-frequency groups.

38. The method as in claim 35 further comprising the step of giving separate consideration to downlink measurement concerning digital control channels and digital voice channels, wherein the step of giving comprises:

the step of identifying the first list of sub-frequency groups comprising the step of identifying separate first list digital voice channel and digital control channel sub-frequency groups characterized as being highly interfered on either the uplink or downlink;

the step of identifying the second list of sub-frequency groups comprising the step of identifying separate second list digital voice channel and digital control channel sub-frequency groups characterized as being currently assigned to the neighbor cell of the certain cell;

the step of identifying the third list of sub-frequency groups comprising the step of identifying separate third list digital voice channel and digital control channel sub-frequency groups characterized as being potential candidate digital voice channel and digital control channel, respectively, sub-frequency groups for assignment to the certain cell in a revision to the frequency plan, provided that the third list does not include any of the sub-frequency groups contained in the first and second lists; and the step of ordering mobile stations operating within the certain cell to make downlink interference measurements comprises the step of ordering the mobile station to make downlink measurements on both digital voice channel and digital control channel frequencies comprising the sub-frequency groups contained in the third list.

39. The method as in claim 38 wherein the step of ordering further comprises the step of sharing mobile station downlink interference measurement capacity between making downlink measurements on digital voice channel and digital control channel frequencies comprising the sub-frequency groups contained in the third list.

* * * * *

UNITED STATES PATENT AND TRADEMARK OFFICE
CERTIFICATE OF CORRECTION

PATENT NO.     : 6,212,386 B1
DATED          : April 3, 2001
INVENTOR(S)    : Sylvain Briere et al.

It is certified that error appears in the above-identified patent and that said Letters Patent is hereby corrected as shown below:

<u>Title page,</u>
Item [54], delete "AUTOMATED TOOL METHOD FOR" replace with -- AUTOMATED TOOL AND METHOD FOR --

<u>Column 15,</u>
Line 58, delete "frequency. of" replace with -- frequency. Of --

Signed and Sealed this

Sixth Day of November, 2001

Attest:

*Nicholas P. Godici*

Attesting Officer

NICHOLAS P. GODICI
*Acting Director of the United States Patent and Trademark Office*